(12) United States Patent
Tashiro et al.

(10) Patent No.: US 11,742,154 B2
(45) Date of Patent: Aug. 29, 2023

(54) ELECTRICITY STORAGE MODULE AND ELECTRICITY STORAGE UNIT

(71) Applicant: Panasonic Intellectual Property Management Co., Ltd., Osaka (JP)

(72) Inventors: Yuichi Tashiro, Kyoto (JP); Toshiaki Shimizu, Kyoto (JP); Yuji Sonoda, Kyoto (JP); Masahiro Nakaji, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 742 days.

(21) Appl. No.: 16/615,796

(22) PCT Filed: May 23, 2018

(86) PCT No.: PCT/JP2018/019825
§ 371 (c)(1),
(2) Date: Nov. 21, 2019

(87) PCT Pub. No.: WO2018/216728
PCT Pub. Date: Nov. 29, 2018

(65) Prior Publication Data
US 2020/0185160 A1   Jun. 11, 2020

(30) Foreign Application Priority Data

May 24, 2017 (JP) ................................ 2017-103059
May 24, 2017 (JP) ................................ 2017-103060
(Continued)

(51) Int. Cl.
*H01G 11/74* (2013.01)
*H01M 10/643* (2014.01)
(Continued)

(52) U.S. Cl.
CPC .............. *H01G 11/74* (2013.01); *H01G 2/02* (2013.01); *H01G 9/08* (2013.01); *H01G 11/06* (2013.01);
(Continued)

(58) Field of Classification Search
CPC .......... H01G 11/74; H01G 11/10; H01G 2/02; H01G 9/08; H01G 11/06; H01G 11/82;
(Continued)

(56) References Cited

U.S. PATENT DOCUMENTS

2002/0021107 A1* 2/2002 Ripoll Anton ...... H01M 50/244
320/112
2003/0190837 A1 10/2003 Wu
(Continued)

FOREIGN PATENT DOCUMENTS

CN          2562378 Y      7/2003
CN         205863576 U      1/2017
(Continued)

OTHER PUBLICATIONS

International Search Report issued in corresponding International Patent Application No. PCT/JP2018/019825, dated Aug. 14, 2018, w/English translation.
(Continued)

*Primary Examiner* — Brian R Ohara
*Assistant Examiner* — Aaron J Salter
(74) *Attorney, Agent, or Firm* — McDermott Will & Emery LLP

(57) ABSTRACT

This electricity storage module includes: a plurality of electricity storage device; a device holder; a first external output terminal and a second external output terminal which are configured to be electrically connected to the plurality of electricity storage devices; and a terminal holder having one end portion and another end portion, the one end portion
(Continued)

being configured to have the first external output terminal attached thereto, the other end portion being configured to have the second external output terminal attached thereto. The first external output terminal includes a coupling terminal part protruding to an outer side of a terminal holder in a direction in which the first external output terminal and the second external output terminal are arranged. The second external output terminal includes an external connection terminal part capable of being connected to an external terminal or the coupling terminal part on an inner side of the terminal holder.

13 Claims, 21 Drawing Sheets

(30) Foreign Application Priority Data

| | | |
|---|---|---|
| May 24, 2017 | (JP) | 2017-103063 |
| May 24, 2017 | (JP) | 2017-103067 |
| Mar. 29, 2018 | (JP) | 2018-064500 |

(51) Int. Cl.

| | |
|---|---|
| *H01M 10/6555* | (2014.01) |
| *H01G 2/02* | (2006.01) |
| *H01G 9/08* | (2006.01) |
| *H01G 11/06* | (2013.01) |
| *H01G 11/10* | (2013.01) |
| *H01G 11/82* | (2013.01) |
| *H01M 50/502* | (2021.01) |
| *H01M 10/48* | (2006.01) |
| *H01M 50/213* | (2021.01) |

(52) U.S. Cl.
CPC .............. *H01G 11/10* (2013.01); *H01G 11/82* (2013.01); *H01M 10/482* (2013.01); *H01M 10/486* (2013.01); *H01M 10/643* (2015.04); *H01M 10/6555* (2015.04); *H01M 50/502* (2021.01); *H01M 50/213* (2021.01)

(58) Field of Classification Search
CPC ........... H01M 10/643; H01M 10/6555; H01M 50/502; H01M 50/213
See application file for complete search history.

(56) References Cited

U.S. PATENT DOCUMENTS

| | | | | |
|---|---|---|---|---|
| 2005/0175892 A1* | 8/2005 | Mizutani | ........... | H01M 10/0587 429/174 |
| 2005/0287400 A1* | 12/2005 | Cho | ................. | H01M 10/4207 429/61 |
| 2009/0155673 A1* | 6/2009 | Northcott | .......... | H01M 10/4207 429/61 |
| 2011/0293998 A1 | 12/2011 | Sato et al. | | |
| 2012/0082887 A1 | 4/2012 | Ninomiya et al. | | |
| 2014/0030566 A1* | 1/2014 | Lee | ..................... | H01M 50/264 429/90 |
| 2014/0154539 A1* | 6/2014 | Kwok | ................ | H01M 10/643 429/82 |
| 2014/0349164 A1* | 11/2014 | Park | ..................... | H01M 50/50 429/121 |
| 2015/0086846 A1* | 3/2015 | Baek | ................... | H01M 50/502 429/159 |
| 2015/0249278 A1 | 9/2015 | Park et al. | | |
| 2015/0280190 A1* | 10/2015 | Ohshiba | ............... | H01M 50/24 429/100 |
| 2015/0311485 A1* | 10/2015 | Fister | ................. | H01M 50/262 429/151 |
| 2016/0197315 A1* | 7/2016 | Tatsumi | ............. | H01M 50/183 429/185 |
| 2017/0256826 A1* | 9/2017 | Hong | ................. | H01M 10/425 |

FOREIGN PATENT DOCUMENTS

| | | |
|---|---|---|
| JP | H01-129764 U | 9/1989 |
| JP | 2011-009477 A | 1/2011 |
| JP | 2011-253641 A | 12/2011 |
| JP | 2014-220128 A | 11/2014 |
| JP | 2016-081795 A | 5/2016 |
| WO | 2014/181820 A1 | 11/2014 |

OTHER PUBLICATIONS

Chinese Office Action issued in corresponding Chinese Patent Application No. 201880031381.6, dated May 11, 2022, with English translation of the cover pages and Search Report.

Chinese Office Action issued in corresponding Chinese Patent Application No. 201880031381.6, dated Oct. 11, 2021, with English translation of the cover pages and Search Report.

\* cited by examiner

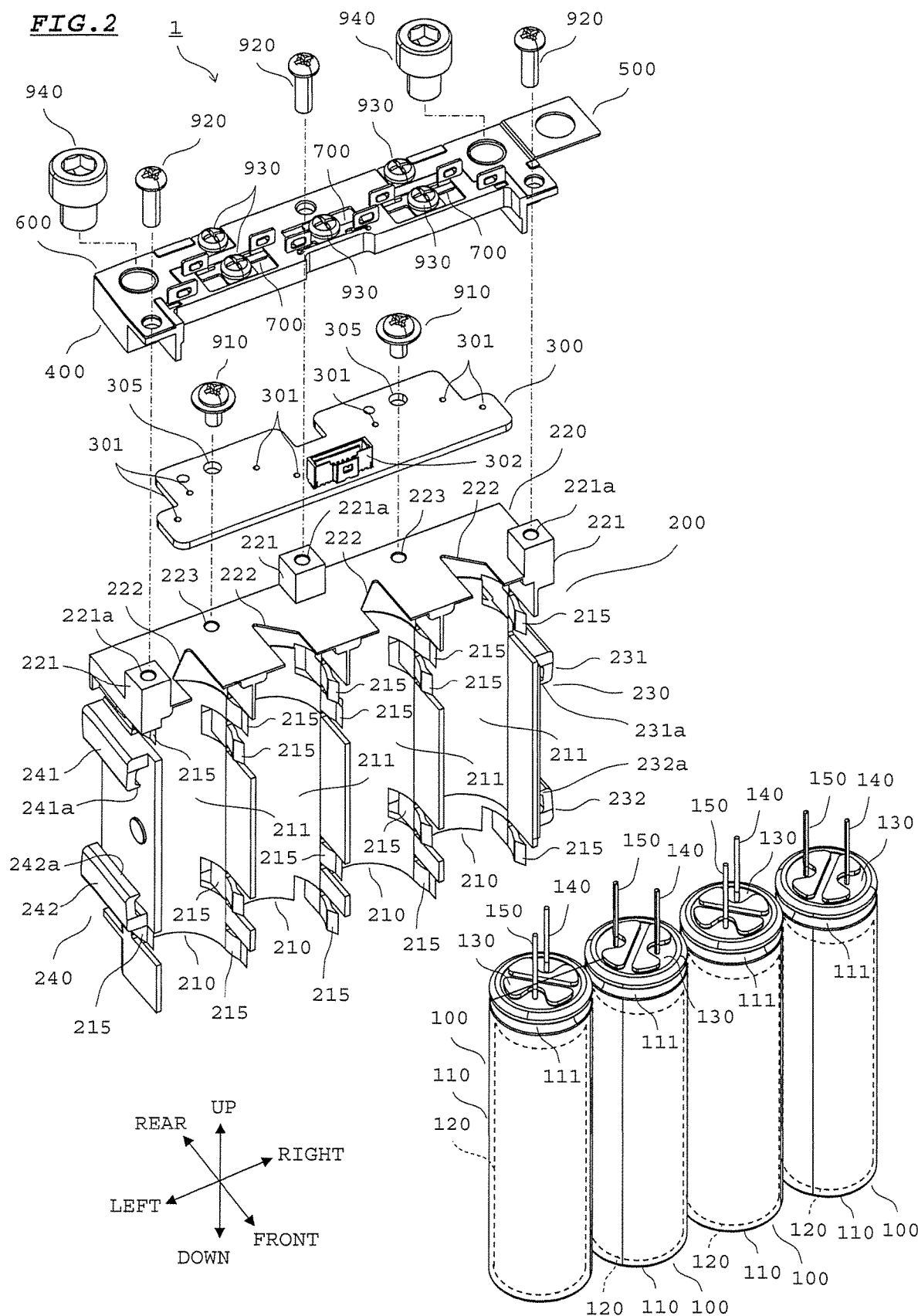

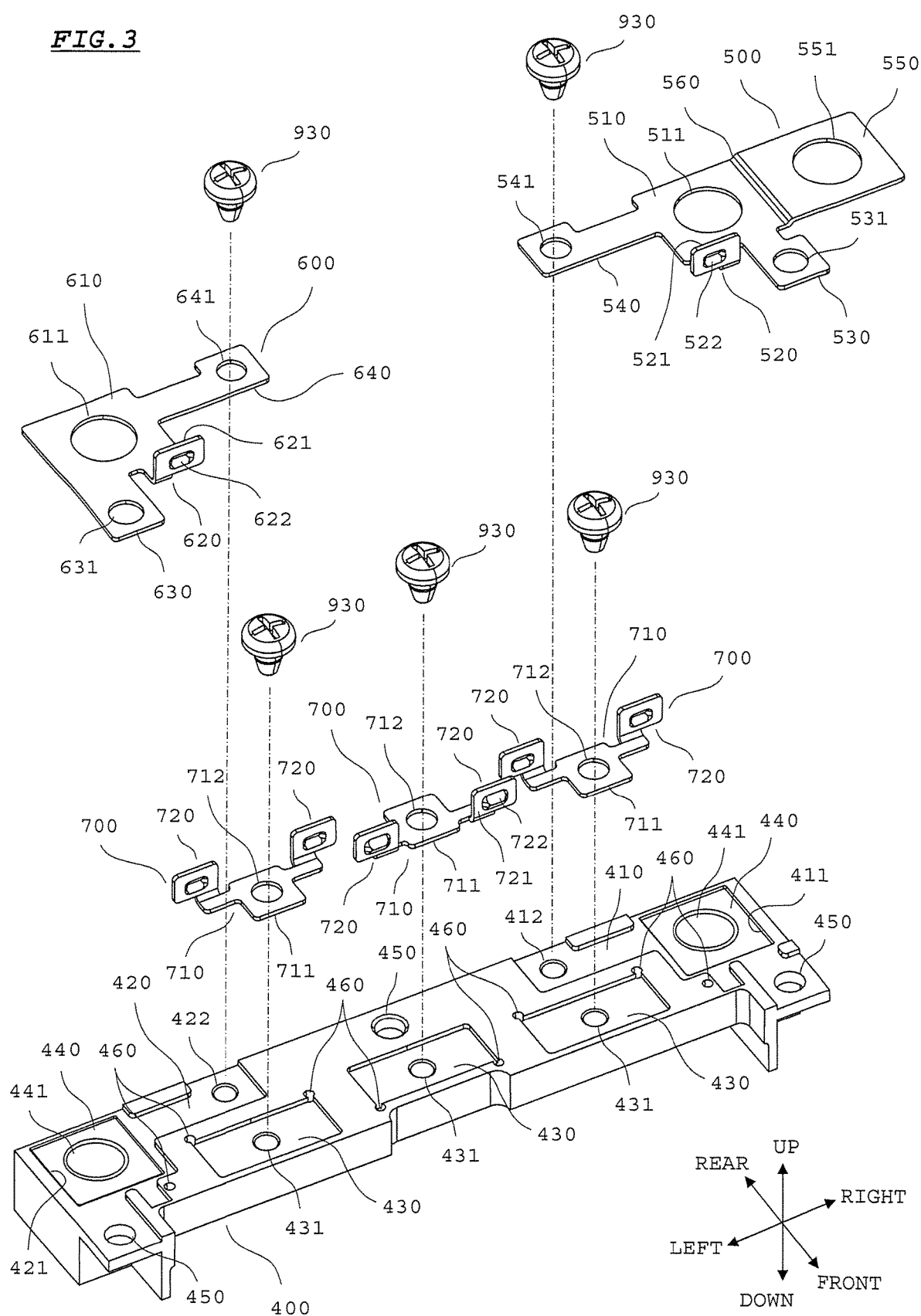

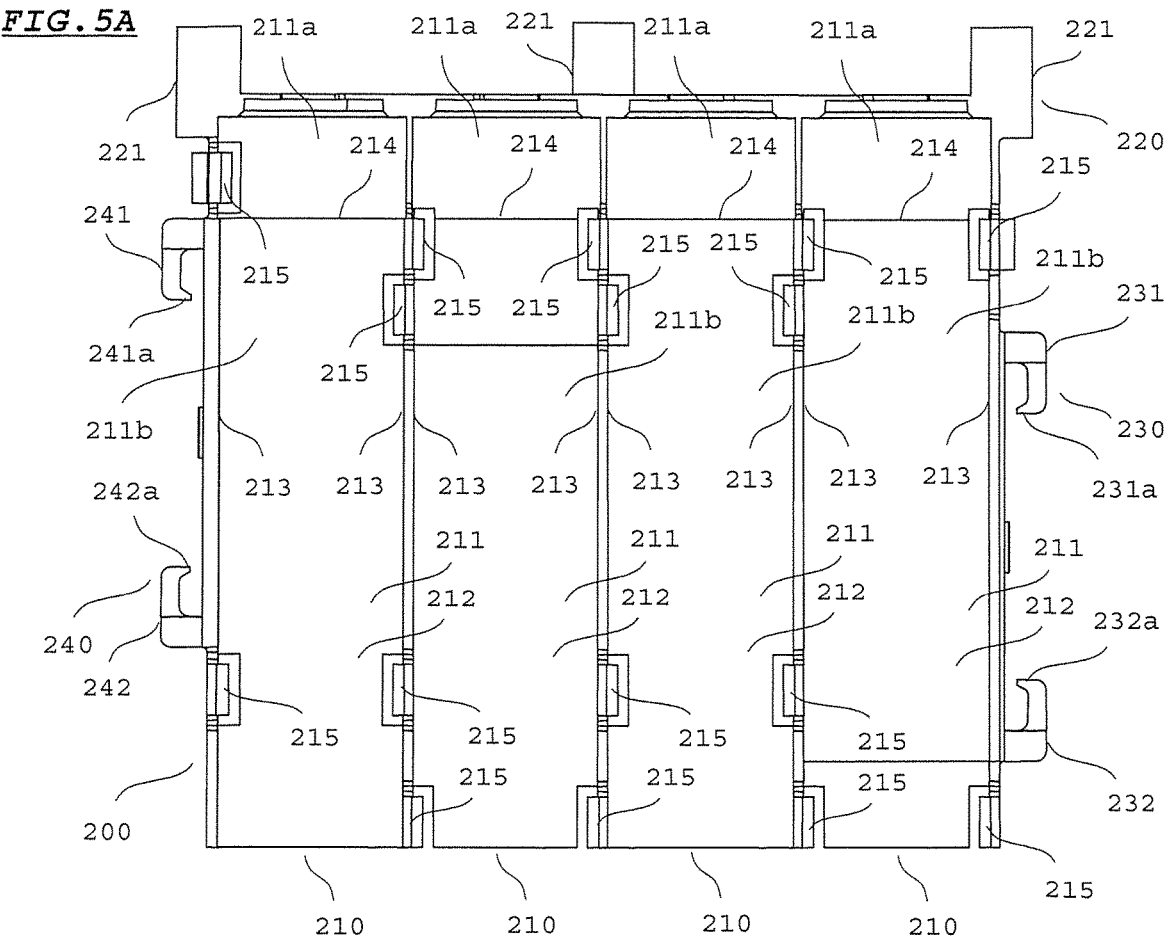
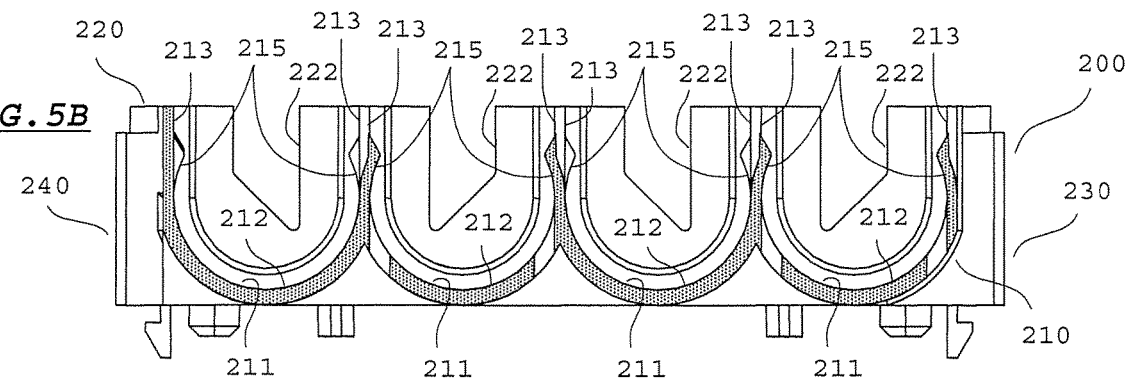
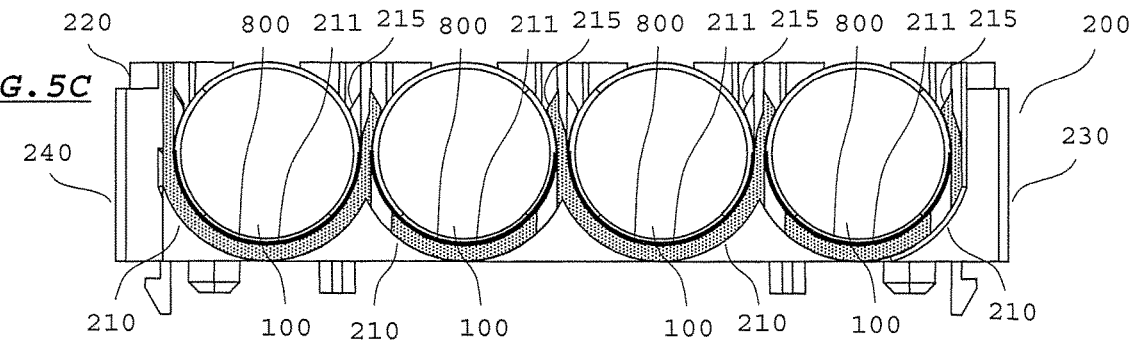

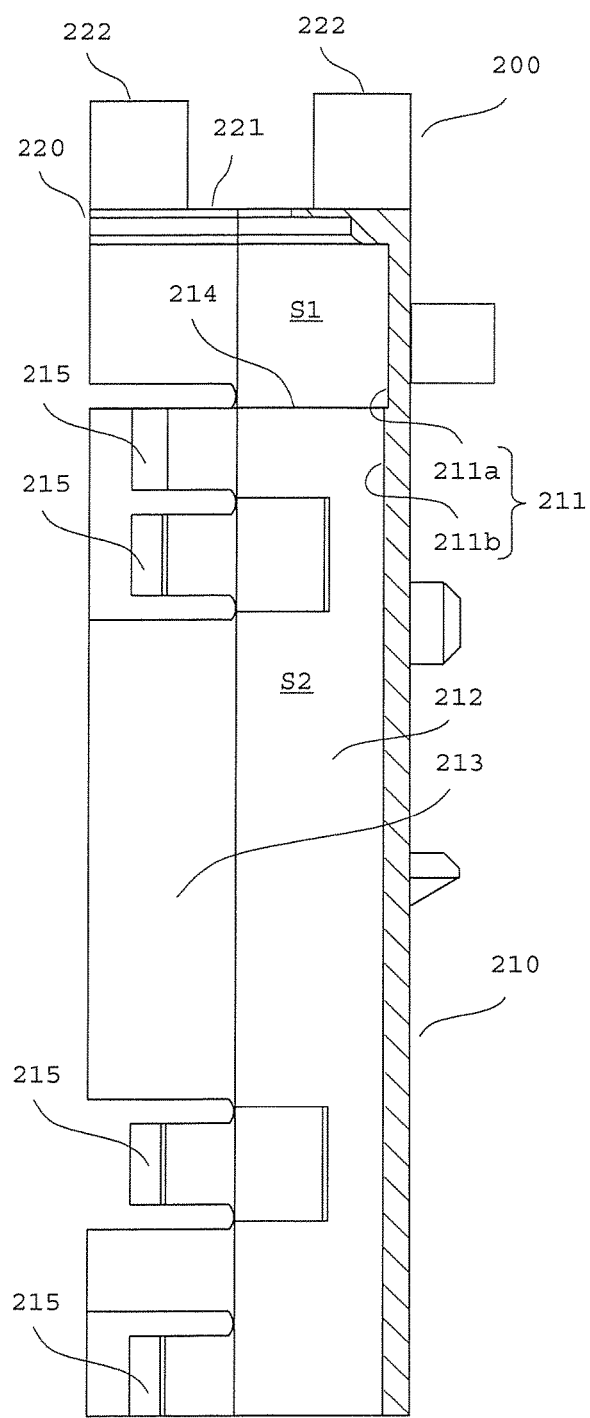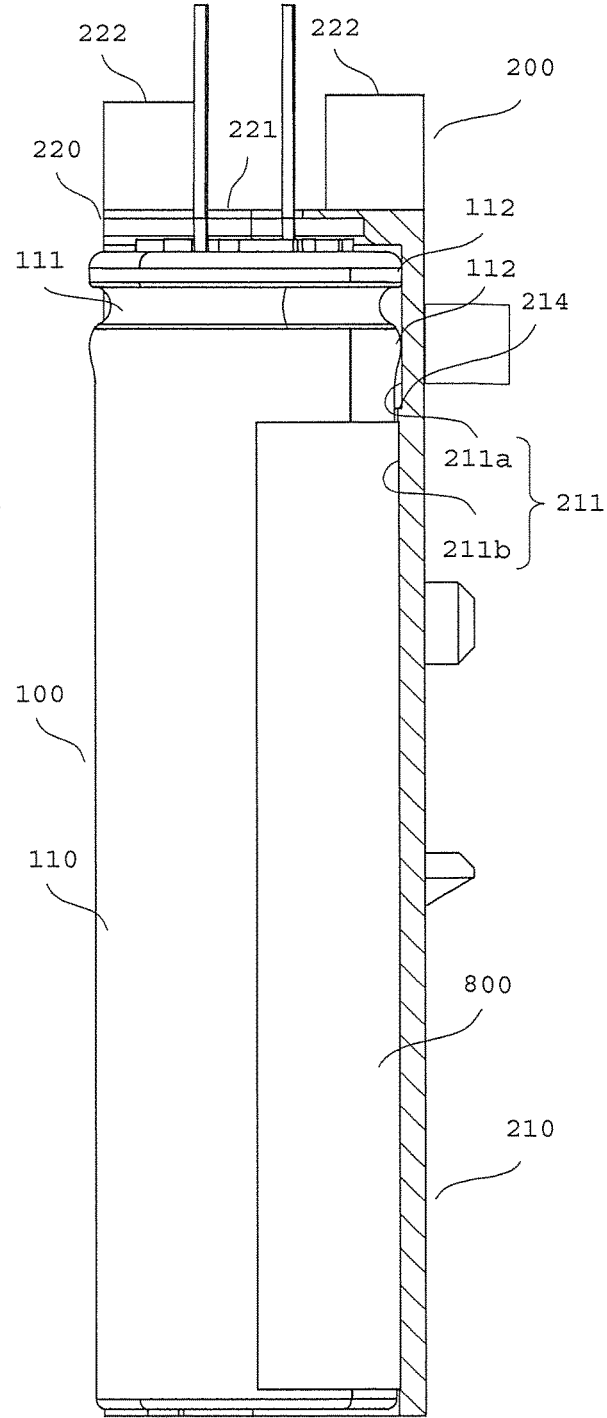

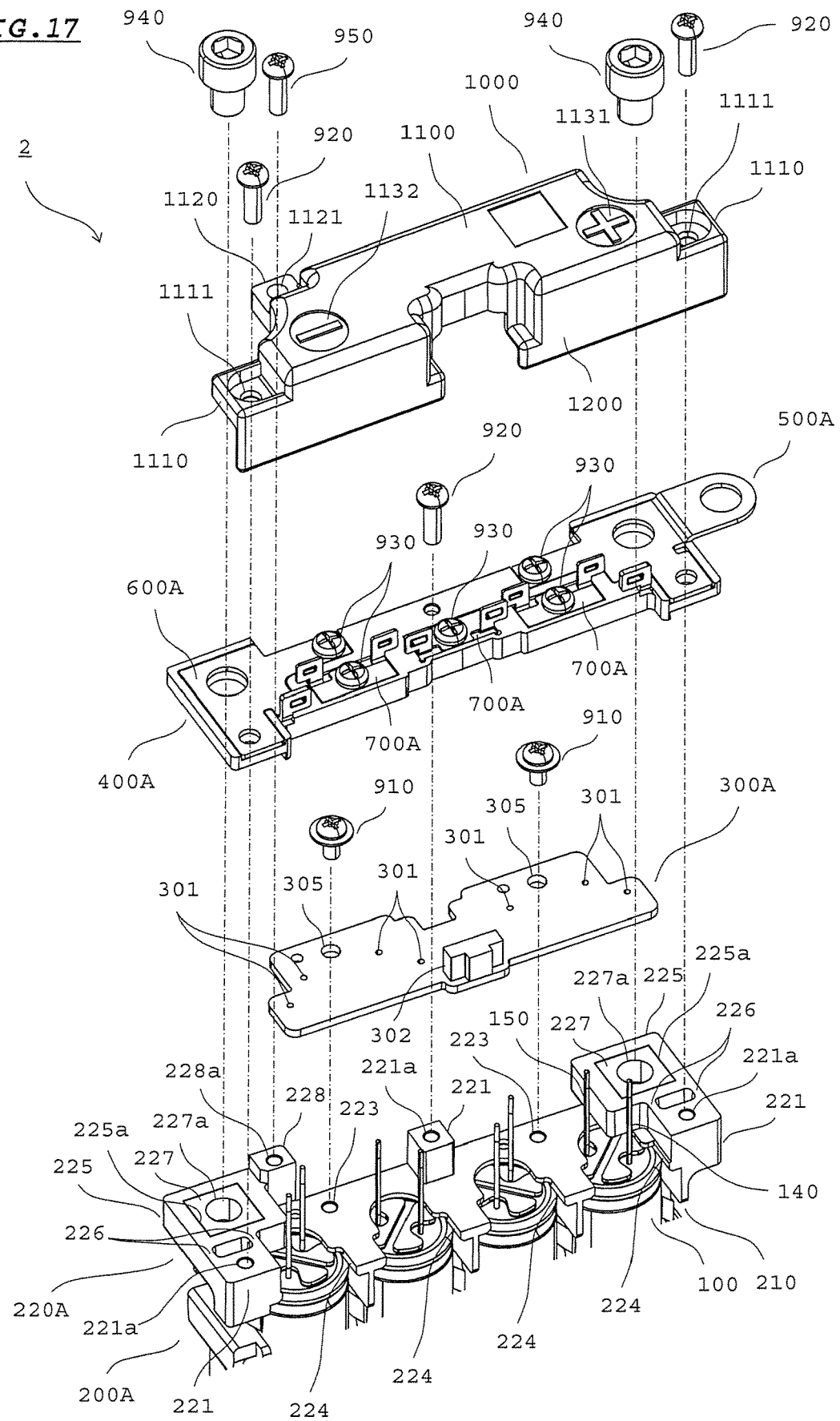

ELECTRICITY STORAGE MODULE AND ELECTRICITY STORAGE UNIT

CROSS-REFERENCE OF RELATED APPLICATIONS

This application is the U.S. National Phase under 35 U.S.C. § 371 of International Patent Application No. PCT/JP2018/019825, filed on May 23, 2018, which in turn claims the benefit of Japanese Application No. 2017-103059, filed on May 24, 2017, Japanese Application No. 2017-103060, filed on May 24, 2017, Japanese Application No. 2017-103063, filed on May 24, 2017, Japanese Application No. 2017-103067, filed on May 24, 2017, and Japanese Application No. 2018-064500, filed on Mar. 29, 2018, the entire disclosures of which Applications are incorporated by reference herein.

TECHNICAL FIELD

The present invention relates to an electricity storage module formed by a plurality of electricity storage devices. The present invention also relates to an electricity storage unit formed by a plurality of electricity storage modules.

BACKGROUND ART

A battery unit formed by connecting a plurality of battery blocks in series or in parallel is known (for example, see Patent Literature 1). As for the battery unit, in a battery block, for example, a plurality of batteries are arranged in rows, and both end portions of the batteries are fixed by two battery holders. As for the plurality of batteries, positive electrode terminals are electrically connected to a positive electrode metal plate, and negative electrode terminals are connected to a negative electrode metal plate. In each battery block, a connection part (an output terminal on the positive electrode side of the battery block) provided at an end portion of the positive electrode metal plate protrudes outwardly at one side face of the battery block, and a connection part (an output terminal on the negative electrode side of the battery block) provided at an end portion of the negative electrode metal plate protrudes outwardly at a side face opposite to the one side face of the battery block. In the battery unit, two battery blocks adjacent to each other are arranged in a direction orthogonal to the direction in which the connection part of the positive electrode metal plate and the connection part of the negative electrode metal plate protrude. The connection part of the positive electrode metal plate of one battery block and the connection part of the negative electrode metal plate of the next battery block are disposed so as to be adjacent to each other, and these two connection parts are electrically connected by a connection metal plate.

CITATION LIST

Patent Literature

[PTL 1] Japanese Laid-Open Patent Publication No. 2011-253641

SUMMARY OF THE INVENTION

Problems to be Solved by the Invention

In the case of the configuration of the battery block in the electricity storage unit described above, if two battery blocks adjacent to each other are arranged in the above-described protruding direction (the direction in which the two connection parts are arranged) such that the connection part of the positive electrode metal plate of one battery block and the connection part of the negative electrode metal plate of the next battery block are adjacent to each other and the two connection parts are electrically connected by a connection metal plate, the adjacent two battery blocks are separated from each other by the size of the two connection parts. This could result in an enlarged size of the battery unit.

In view of the above problem, an object of the present invention is to make an electricity storage unit compact when the electricity storage unit is formed by combining a plurality of electricity storage modules.

Solution to the Problems

A first aspect of the present invention relates to an electricity storage module. The electricity storage module according to the present aspect includes: a plurality of electricity storage devices capable of discharging stored electric power; a device holding part in which the plurality of electricity storage devices are held; a first output terminal and a second output terminal which have polarities different from each other and which are configured to be electrically connected to the plurality of electricity storage devices; and a terminal attachment part having one end portion and another end portion, the one end portion being configured to have the first output terminal attached thereto, the other end portion being configured to have the second output terminal attached thereto. Here, the first output terminal includes a first terminal part protruding to an outer side of the terminal attachment part, and the second output terminal includes a second terminal part capable of being connected to an external terminal or the first terminal part on an inner side of the terminal attachment part.

A second aspect of the present invention relates to an electricity storage unit. The electricity storage unit according to the present aspect includes: a first electricity storage module; and a second electricity storage module adjacent to the first electricity storage module. Here, the first electricity storage module and the second electricity storage module each include: a plurality of electricity storage devices capable of discharging stored electric power; a device holding part in which the plurality of electricity storage devices are held; a first output terminal and a second output terminal which have polarities different from each other and which are configured to be electrically connected to the plurality of electricity storage devices; and a terminal attachment part having one end portion and another end portion, the one end portion being configured to have the first output terminal attached thereto, the other end portion being configured to have the second output terminal attached thereto. The first output terminal of the first electricity storage module has a first terminal part protruding to an outer side of the terminal attachment part toward the second electricity storage module, and the second output terminal of the second electricity storage module has a second terminal part capable of being connected to the first terminal part on an inner side of the terminal attachment part.

Advantageous Effects of the Invention

According to the present invention when an electricity storage unit is formed by combining a plurality of electricity storage modules, the electricity storage unit can be made compact.

The effects and the significance of the present invention will be further clarified by the description of the embodiments below. However, the embodiments below are merely examples for implementing the present invention. The present invention is not limited by the embodiments below in any way.

BRIEF DESCRIPTION OF THE DRAWINGS

FIG. 2 is an exploded perspective view of the electricity storage module according to the embodiment.

FIG. 3 is an exploded perspective view of a terminal holder, a first external output terminal, a second external output terminal, and relay connection terminals according to the embodiment.

FIG. 5A is a front view of the device holder according to the embodiment, FIG. 5B is a bottom view of the device holder according to the embodiment, and FIG. 5C is a bottom view of the device holder having the electricity storage devices attached thereto, according to the embodiment.

FIG. 6A is a side cross-sectional view of the device holder according to the embodiment, and FIG. 6B is a side cross-sectional view of the device holder having the electricity storage devices attached thereto, according to the embodiment.

FIG. 17 is an exploded perspective view of an upper portion of the electricity storage module according to Modification 2.

BEST MODE FOR CARRYING OUT THE INVENTION

Figure 1:
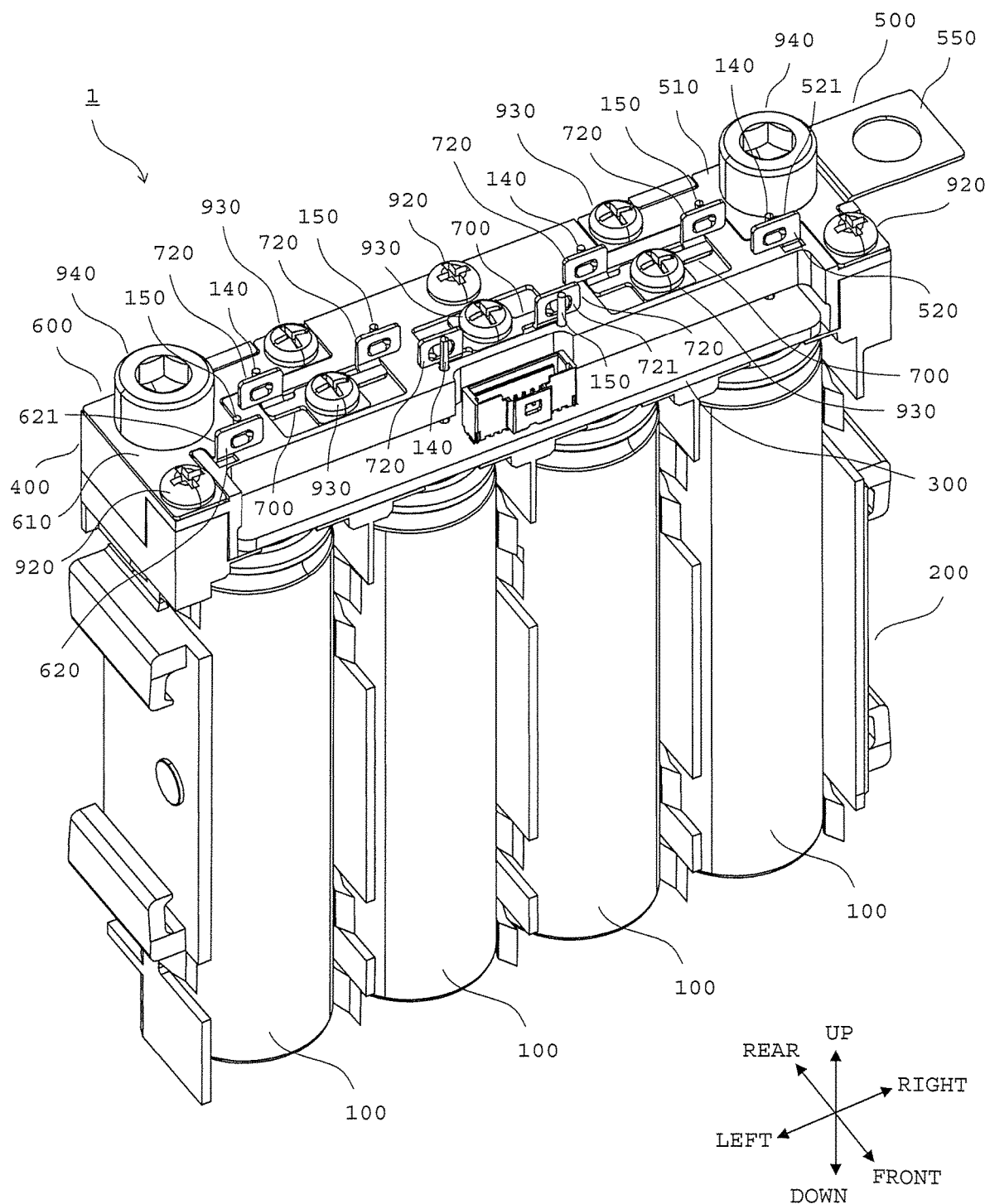
FIG. 1 is a perspective view of an electricity storage module according to an embodiment.

In the following, an electricity storage module 1 and an electricity storage unit 10 according to the present embodiment are described with reference to the drawings. For convenience, front, rear, left, right, up, and down directions are indicated in the drawings as appropriate. It should be noted that the directions in the drawings merely indicate relative directions in the electricity storage module 1 and do not denote absolute directions.

In the present embodiment, a first electricity storage module 1A and a second electricity storage module 1B respectively correspond to "first electricity storage module" and "second electricity storage module" described in claims. A positive electrode lead terminal 140 and a negative electrode lead terminal 150 correspond to "lead terminal" described in claims. Further, a device holder 200 corresponds to "device holding part" described in claims. A pair of claw parts 215 corresponds to "support part" described in claims. Further, a first coupling part 230 and a second coupling part 240 respectively correspond to "first coupling part" and "second coupling part" described in claims. Further, a through-hole 301 corresponds to "through-hole" described in claims. Further, a terminal holder 400 corresponds to "terminal attachment part" described in claims. Further, a first terminal mounting part 410 and a second terminal mounting part 420 respectively correspond to "first receiving part" and "second receiving part" described in claims. Further, a terminal insertion hole 460 corresponds to "insertion part" described in claims. Further, a first external output terminal 500 corresponds to "first output terminal" and "connection terminal" described in claims. Further, a second external output terminal 600 corresponds to "second output terminal" and "connection terminal" described in claims. Further, a relay connection terminal 700 corresponds to "connection terminal" described in claims. Further, a coupling terminal part 550 corresponds to "first terminal part" described in claims. Further, an external connection terminal part 610 corresponds to "second terminal part" described in claims. Further, an external connection terminal part 510 corresponds to "third terminal part" described in claims. Further, lead terminal connection parts 520, 620, 720 correspond to "terminal connection part" described in claims. Further, a terminal fixing screw 930 corresponds to "first fixation tool" and "second fixation tool" described in claims.

However, the above description is merely for providing correspondence between the configurations described in claims and configurations of the embodiment. The above correspondence does not limit the invention described in claims to the configurations of the embodiment in any way.

<Configuration of Electricity Storage Module>

Figure 4A:
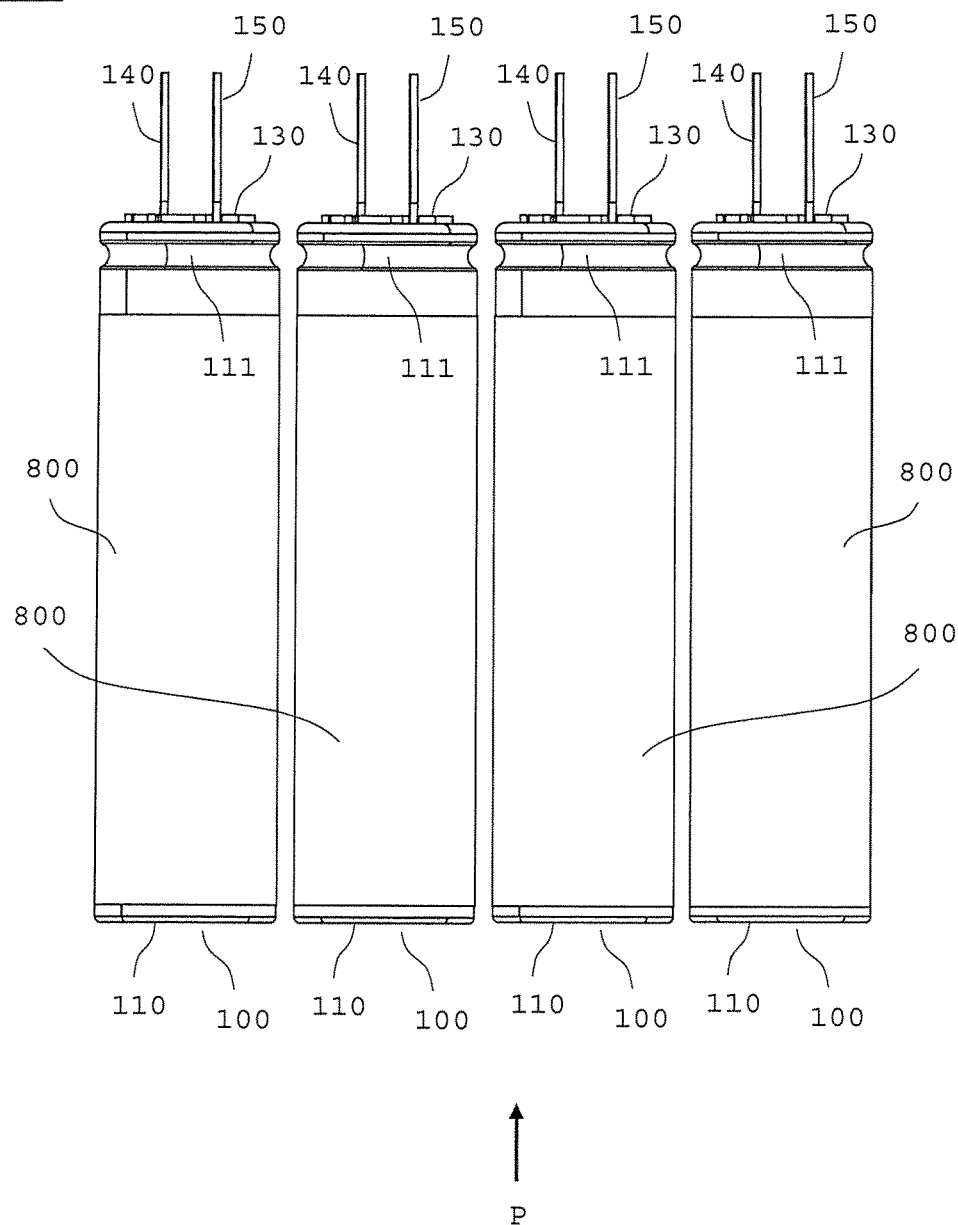
FIG. 4A shows four electricity storage devices viewed from a device holder side in FIG. 2, according to the embodiment.
Figure 4B:
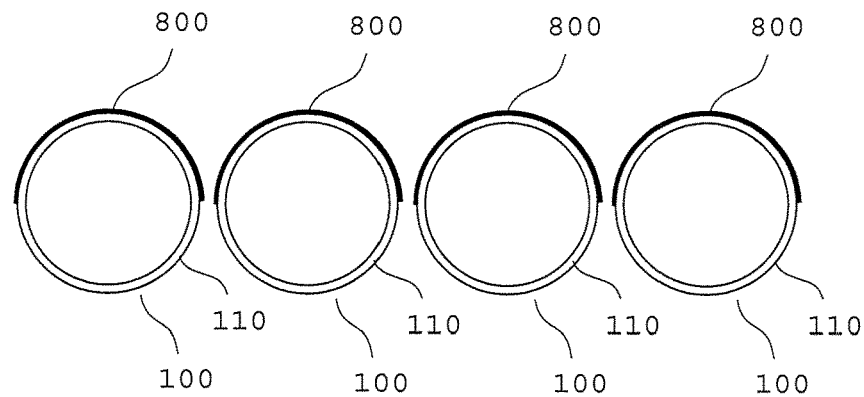
FIG. 4B shows the four electricity storage devices viewed in a direction P shown in FIG. 4A, according to the embodiment.
Figure 7:
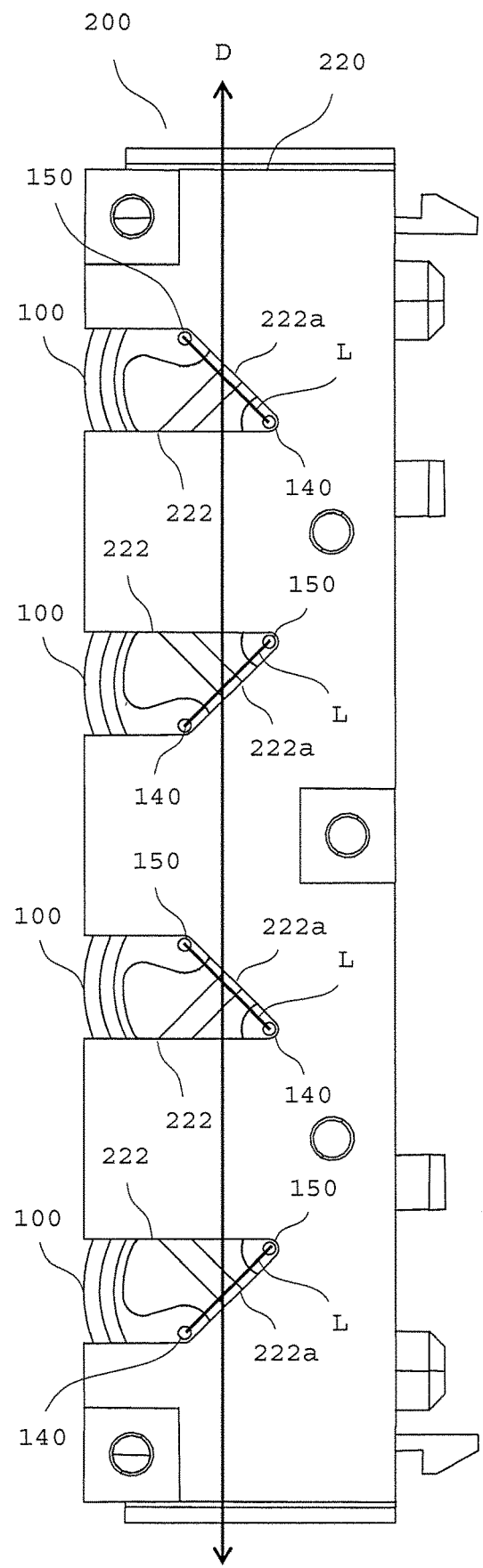
FIG. 7 is a plan view of the device holder having the electricity storage devices attached thereto, according to the embodiment.
Figure 8:
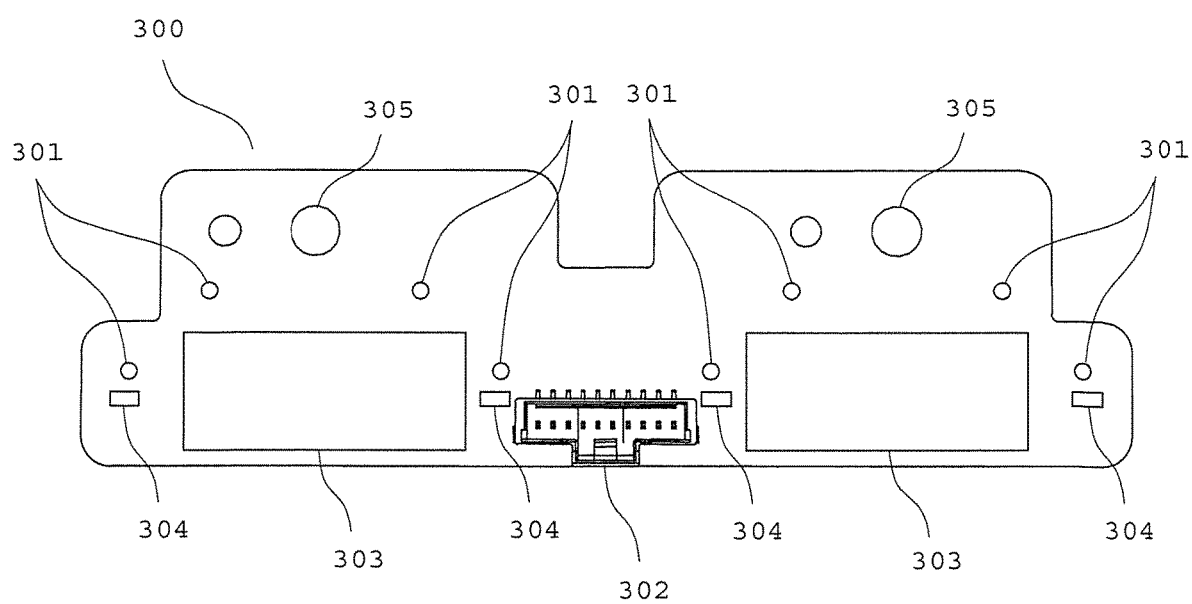
FIG. 8 is a plan view of a circuit board according to the embodiment.
Figure 9A:
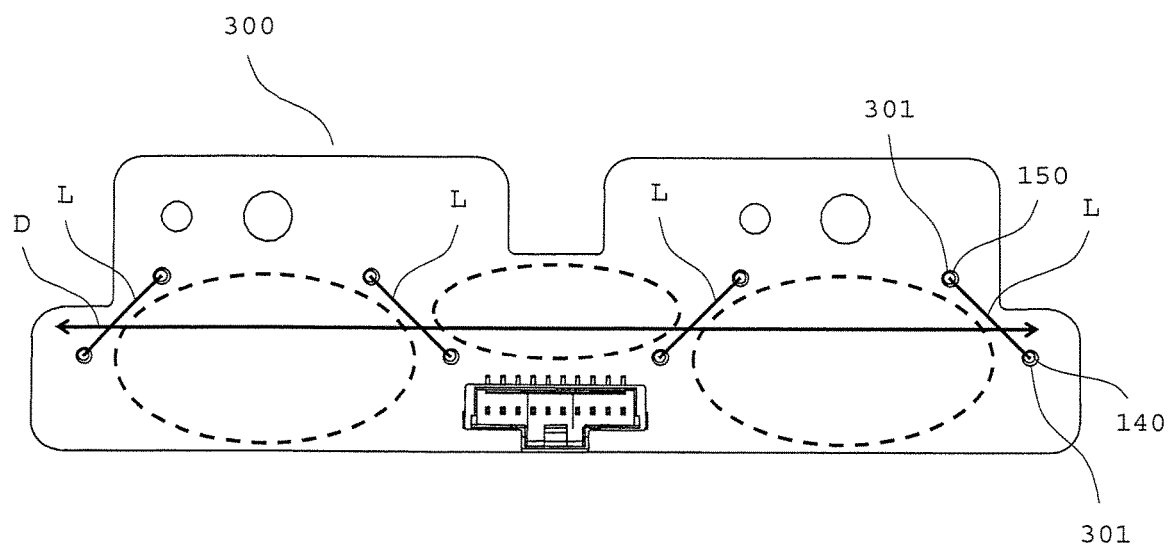
FIG. 9A is a plan view of a circuit board in a state where positive electrode lead terminals and negative electrode lead terminals are passed therethrough, according to the embodiment.
Figure 9B:
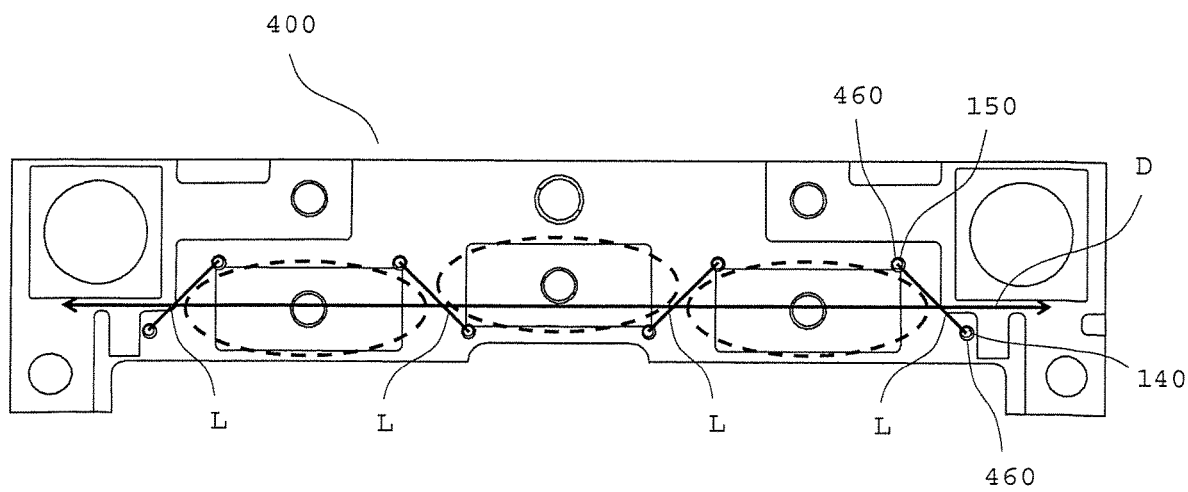
FIG. 9B is a plan view of the terminal holder in a state where positive electrode lead terminals and negative electrode lead terminals are passed therethrough, according to the embodiment.

FIG. 1 is a perspective view of an electricity storage module 1. FIG. 2 is an exploded perspective view of the electricity storage module 1. FIG. 3 is an exploded perspective view of a terminal holder 400, a first external output terminal 500, a second external output terminal 600, and relay connection terminals 700. FIG. 4A shows four electricity storage devices 100 viewed from a device holder 200 side in FIG. 2. FIG. 4B shows the four electricity storage devices 100 viewed in a direction P shown in FIG. 4A. FIG. 5B is a front view of the device holder 200, FIG. 5B is a bottom view of the device holder 200, and FIG. 5C is a bottom view of the device holder 200 having the electricity storage devices 100 attached thereto. FIG. 6A is a side cross-sectional view of the device holder 200, and FIG. 6B is a side cross-sectional view of the device holder 200 having the electricity storage devices 100 attached thereto. FIG. 7 is a plan view of the device holder 200 having the electricity storage devices 100 attached thereto. FIG. 8 is a plan view of a circuit board 300. FIG. 9A is a plan view of the circuit board 300 in a state where positive electrode lead terminals 140 and negative electrode lead terminals 150 are passed therethrough, and FIG. 9B is a plan view of the terminal holder 400 in a state where the positive electrode lead terminals 140 and the negative electrode lead terminals 150 are passed therethrough. In FIG. 6B, only the device holder 200 is shown in a cross-section.

The electricity storage module 1 includes four electricity storage devices 100, the device holder 200, the circuit board 300, the terminal holder 400, the first external output terminal 500, the second external output terminal 600, and three relay connection terminals 700. The electricity storage module 1 includes: a double-sided adhesive tape 800 for fixing each electricity storage device 100 to the device holder 200; two board fixing screws 910 for fixing the circuit board 300 to the device holder 200; three holder fixing screws 920 for fixing the terminal holder 400 to the device holder 200; five terminal fixing screws 930 for fixing the first external output terminal 500, the second external output terminal 600, and the three relay connection terminals 700 to the terminal holder 400; and fixing bolts 940 to be used when connecting the first external output terminal 500 and the second external output terminal 600 to external terminals (not shown).

Examples of the electricity storage device 100 include a lithium ion secondary battery in which an active material of the positive electrode is a lithium transition metal oxide such as lithium cobaltate and an active material of the negative electrode is a carbon material. The electricity storage device 100 is not limited to a nonaqueous electrolyte secondary battery, and may be a secondary battery other than a nonaqueous electrolyte secondary battery, or may be a primary battery.

The electricity storage device 100 may be a capacitor such as a lithium ion capacitor. An electricity storage device 100 in which a conductive polymer is used as an active material of the positive electrode may be employed. Examples of the conductive polymer include polyaniline, polypyrrole, or polythiophene, derivatives thereof, and the like. A plurality of types of conductive polymers may be used.

Each electricity storage device 100 includes: a container 110 having a bottomed slender cylindrical shape; a device element 120 accommodated in the container 110; a sealing body 130 sealing an opening of the container 110; and a positive electrode lead terminal 140 and a negative electrode lead terminal 150 which are drawn from the sealing body 130 to the outside. Each electricity storage device 100 includes a nonaqueous electrolytic solution (not shown).

The device element 120 is formed by winding a positive electrode and a negative electrode with a separator provided therebetween. The device element 120 can be of a laminated type instead of the wound type as described above.

The sealing body 130 is formed from an elastic material that includes a rubber component, for example, and closes the opening of the container 110 so as to prevent leakage of the nonaqueous electrolytic solution filled in the container 110. The positive electrode lead terminal 140 is electrically connected to the positive electrode of the device element 120. The negative electrode lead terminal 150 is electrically connected to the negative electrode of the device element 120.

The opening end portion of the container 110 is subjected to narrowing processing in order to fix the sealing body 130. Accordingly, the peripheral face of the container 110 has formed therein a narrowed part 111 in which a portion, around the outer periphery of the sealing body 130, of the peripheral face of the container 110 is inwardly narrowed. The peripheral face of the container 110 serves as the peripheral face of the electricity storage device 100.

The double-sided adhesive tape 800 is affixed in advance to each electricity storage device 100 before the electricity storage device 100 is attached to the device holder 200. The double-sided adhesive tape 800 has a rectangular shape of a predetermined size. As shown in FIG. 4A, in the axial direction of the electricity storage device 100, the double-sided adhesive tape 800 covers the peripheral face of the electricity storage device 100 from a position slightly separated from the narrowed part 111 to a position near the bottom of the electricity storage device 100. In addition, as shown in FIG. 4B, in the circumferential direction of the electricity storage device 100, the double-sided adhesive tape 800 covers substantially a half of the peripheral face of the electricity storage device 100. The double-sided adhesive tape 800 is configured as an acrylic adhesive formed in a sheet shape, and does not include a base material such as a nonwoven fabric or a resin film such as cellophane, polypropylene, acrylic, or polyethylene terephthalate. Preferably, the thickness of the double-sided adhesive tape 800 is about 50 μm to 200 μm, for example.

The device holder 200 is formed from a resin material such as a thermoplastic resin or a thermosetting resin. Examples of the thermoplastic resin include polyphenylene sulfide (PPS), polybutylene terephthalate (PBT), and the like. Examples of the thermosetting resin include epoxy compound, phenol resin, urea resin, polyimide, polyurethane, diallyl phthalate, unsaturated polyester, and the like. A filler, a softener, or the like may be included in addition to the resin material. As the filler, for example, particles and/or fibers that have insulating properties are preferable. Examples of the insulating material serving as the filler include compounds (e.g., oxides) that have insulating properties such as silica and alumina, and inorganic materials such as glass and mineral materials (e.g., talc, mica, clay). The device holder 200 may include one type of these fillers, or may include a combination of two or more types of these fillers. The content of the filler in the device holder 200 is 10 to 90 mass %, for example. In order to enhance heat resistance, an additive may be added to the device holder 200. When a hardening resin is used as the resin material, a hardener, a polymerization initiator, a catalyst, or the like may be added as appropriate in accordance with the type of the hardening resin.

The device holder 200 includes four accommodation parts 210 continuous in the left-right direction in order to hold the four electricity storage devices 100 in a state of being arranged in the left-right direction. Each accommodation part 210 is formed in a slender tubular shape that has both ends open and that has a U-shaped cross-section, so as to be able to accommodate substantially the entirety of the electricity storage device 100 from the front side. An inner face 211 of each accommodation part 210 includes: a face 212 having a semicircular arc shape (hereinafter, referred to as "semicircular arc face 212"); and faces 213 continuous from both ends of the semicircular arc face 212 and each having a linear shape (hereinafter, referred to as "linear face 213"). When setting a diameter of the semicircular arc face 212, the outer diameter of the electricity storage device 100 and the thickness of the double-sided adhesive tape 800 are taken into consideration. For example, the diameter of the semicircular arc face 212 is set to be greater than the outer diameter of the electricity storage device 100 by the thickness of the double-sided adhesive tape 800.

The inner face 211 of each accommodation part 210 includes a first region 211a present in an upper end portion of the accommodation part 210, and a second region 211b that is a region other than the first region 211a. As shown in FIG. 6A, a step 214 is formed between the first region 211a and the second region 211b such that an accommodation space S1 of the accommodation part 210 in the first region 211a is greater than an accommodation space S2 of the accommodation part 210 in the second region 211b.

As for each accommodation part 210, in the second region 211b, a pair of claw parts 215 is provided at each of an upper portion and a lower portion thereof. Each claw part 215 is formed at each of the linear faces 213 on both left and right sides, is curved so as to have the same curvature as the semicircular arc face 212, and protrudes toward the inner side of the accommodation part 210. As for the pair of claw parts 215 in the upper portion of the leftmost accommodation part 210, the claw part 215 are at different height positions from the bottom face of the device holder 200, respectively. However, as for each of the other pairs of claw parts 215, the claw parts 215 are at the same height positions with each other. As for the pair of claw part 215 in the upper portion of the leftmost accommodation part 210, one of the claw parts 215 is provided in the first region 211a.

In two accommodation parts 210 adjacent to each other, the positions of the pairs of claw parts 215 in the upper portion and the lower portion are shifted with respect to each other in the up-down direction. This allows the device holder 200 to have a shape in which side face portions of adjacent accommodation parts 210 are shared. Thus, the size in the left-right direction of the device holder 200 can be made compact.

In the device holder 200, above the four accommodation parts 210, a mounting plate 220 that has a substantially rectangular shape and to which the circuit board 300 and the terminal holder 400 are to be mounted is provided integrally with the four accommodation parts 210. In the mounting plate 220, mounting bosses 221 for mounting the terminal holder 400 are formed in a corner portion on the left front side, a corner portion on the right front side, and a rear portion at the center. Each mounting boss 221 is formed in a quadrangular prism shape and has a mounting hole 221a. In the mounting plate 220, opening portions 222 are formed at positions above the accommodation parts 210, respectively. The front side of each opening portion 222 is open such that the positive electrode lead terminal 140 and the negative electrode lead terminal 150 of the electricity storage device 100 can be inserted from the front. Further, in the mounting plate 220, mounting holes 223 for mounting the circuit board 300 are formed at the left and the right of the mounting boss 221 in the center rear portion.

A first coupling part 230 and a second coupling part 240, to be used when two electricity storage modules 1 are to be coupled in the left-right direction, are respectively provided at the right side face and the left side face of the device holder 200. An electricity storage unit is formed as a result of two or more electricity storage modules 1 being coupled together.

The first coupling part 230 and the second coupling part 240 are formed by upper claw parts 231, 241 which are each positioned at the upper side and which each have a downward hook-like shape, and lower claw parts 232, 242 which are each positioned at the lower side and which each have an upward hook-like shape. The width in the front-rear direction of the upper claw part 231, 241 and the lower claw part 232, 242 is slightly smaller than the width in the front-rear direction of the side faces of the device holder 200. Protrusions 231a, 241a, 232a, 242a protruding toward the side-face sides of the device holder 200 are formed at the leading end portions of the upper claw parts 231, 241 and the leading end portions of the lower claw parts 232, 242. The first coupling part 230 is provided at a lower position than the second coupling part 240 so that, when another electricity storage module 1 is coupled, the first coupling part 230 does not interfere with the second coupling part 240 of the other electricity storage module 1.

The circuit board 300 has a shape that is long in the left-right direction (array direction of the electricity storage devices 100). Pairs of through-holes 301 are formed in the circuit board 300. Through each pair of through-holes 301, the positive electrode lead terminal 140 and the negative electrode lead terminal 150 of a corresponding electricity storage device 100 are passed and electrically connected. The inside of each through-hole 301 is metal-plated. On the circuit board 300, an electronic circuit part 303 is disposed in addition to a connector 302. The electronic circuit part 303 includes a voltage detection circuit (not shown) which detects the voltage of each electricity storage device 100, and a balancing circuit for balancing the voltage of each electricity storage device 100 in accordance with the voltage detected by the voltage detection circuit. Each pair of through-holes 301 are connected to the electronic circuit part 303 through a conductive pattern (not shown). In the circuit board 300, with respect to each of four pairs of through-holes 301, a temperature sensor 304 is disposed at a position closer to one through-hole 301, i.e., at a distance from the one through-hole 301 that is shorter than the distance between the one through-hole 301 and the other through-hole 301. Each temperature sensor 304 is a chip-type thermistor, for example. The temperature sensor 304 detects the temperature of the positive electrode lead terminal 140 or the negative electrode lead terminal 150 which will have a temperature that follows the temperature of the container 110 as a result of propagation of the temperature of the container 110 of the electricity storage device 100. On the basis of the temperature detected by each temperature sensor 304, whether a corresponding electricity storage device 100 is in an overheat state can be monitored. Each temperature sensor 304 need not necessarily be disposed on the front surface (upper face) of the circuit board 300, and may be disposed on the back surface (lower face).

Further, the circuit board 300 has formed therein two insertion holes 305 through which the board fixing screws 910 are passed.

The terminal holder 400 holds the first external output terminal 500, the second external output terminal 600, and the three relay connection terminals 700. The terminal holder 400 is formed from a resin material similar to that for the device holder 200, such as a thermoplastic resin or a thermosetting resin, and has a substantially rectangular parallelepiped shape that is thin in the up-down direction and that is long in the left-right direction (array direction of the electricity storage devices 100).

As shown in FIG. 3, in the terminal holder 400, a first terminal mounting part 410, a second terminal mounting part 420, and three third terminal mounting parts 430 are formed on the surface (upper face) thereof, which serves as the attachment face for the first external output terminal 500, the second external output terminal 600, and the relay connection terminals 700. The first terminal mounting part 410 is formed in a right end portion of the terminal holder 400, has a shape corresponding to the shape of the first external output terminal 500, and is recessed by the thickness of the first external output terminal 500 with respect to the surface of the terminal holder 400. The second terminal mounting part 420 is formed in a left end portion of the terminal holder 400, has a shape corresponding to the shape of the second external output terminal 600, and is recessed by the thickness of the second external output terminal 600 with respect to the surface of the terminal holder 400. The three third terminal mounting parts 430 are formed so as to be arranged in the left-right direction between the first terminal mounting part 410 and the second terminal mounting part 420, each have a rectangular shape, and each is recessed by the thickness of the relay connection terminal 700 with respect to the surface of the terminal holder 400.

The first terminal mounting part 410 and the second terminal mounting part 420 have formed therein quadrangular recessed parts 411, 421, respectively. Quadrangular nuts 440 made from metal are embedded in the recessed parts 411, 421, respectively. A first mounting hole 412 for mounting the first external output terminal 500 is formed in the first terminal mounting part 410. A second mounting hole 422 for mounting the second external output terminal 600 is formed in the second terminal mounting part 420. Further, third mounting holes 431 for mounting the relay connection terminals 700 are formed in the three third terminal mounting parts 430. The first mounting hole 412 of the first terminal mounting part 410 is formed at the same position in the left-right direction as the third mounting hole 431 at the right third terminal mounting part 430. The second mounting hole 422 of the second terminal mounting part 420 is formed at the same position in the left-right direction as the third mounting hole 431 of the left third terminal mounting part 430.

Further, in the terminal holder 400, insertion holes 450 are formed at a position in a corner portion on the right front side in the first terminal mounting part 410, at a position in a corner portion on the left front side in the second terminal mounting part 420, and at a position at the rear of the center third terminal mounting part 430. A holder fixing screw 920 is passed through each insertion hole 450. The back side of each insertion hole 450 of the terminal holder 400 is recessed so as to receive a corresponding mounting boss 221 of the device holder 200. The third mounting hole 431 of the center third terminal mounting part 430 is formed at the same position in the left-right direction as the center insertion hole 450.

Further, in the terminal holder 400, a pair of terminal insertion holes 460 through which the positive electrode lead terminal 140 and the negative electrode lead terminal 150 of each electricity storage device 100 are passed are formed between two terminal mounting parts among the first terminal mounting part 410, the second terminal mounting part 420, and the third terminal mounting parts 430.

Each of the first external output terminal 500, the second external output terminal 600, and the three relay connection terminals 700 is formed by cutting out a conductive metal plate, e.g., a copper plate, into a predetermined shape and bending the cut-out plate. External terminals (not shown) from an external apparatus to which electric power is supplied are connected to the first external output terminal 500 and the second external output terminal 600. In the present embodiment, the first external output terminal 500 serves as the output terminal on the positive electrode side, and the second external output terminal 600 serves as the output terminal on the negative electrode side. The three relay connection terminals 700 connect four electricity storage devices 100 in series between the first external output terminal 500 and the second external output terminal 600.

The first external output terminal 500 includes an external connection terminal part 510, a lead terminal connection part 520, a first fixation part 530, a second fixation part 540, a coupling terminal part 550, and a step part 560. The external connection terminal part 510 is formed in a substantially square shape, and has an insertion hole 511 through which a fixing bolt 940 is passed. The lead terminal connection part 520 is provided on the front side of the external connection terminal part 510. The lead terminal connection part 520 is formed so as to stand substantially perpendicular with respect to the external connection terminal part 510, and extends along the extending direction in which the positive electrode lead terminal 140 and the negative electrode lead terminal 150 extend from the electricity storage device 100. At a connection face 521 of the lead terminal connection part 520, a center portion thereof bulges toward the external connection terminal part 510 side, thereby forming a projection 522. The first fixation part 530 extends forward from the external connection terminal part 510 at the right side relative to the lead terminal connection part 520. The first fixation part 530 has, at a leading end portion thereof, an insertion hole 531 through which a holder fixing screw 920 is passed. The second fixation part 540 extends leftward from the external connection terminal part 510. The second fixation part 540 has, at a leading end portion thereof, an insertion hole 541 through which a terminal fixing screw 930 is passed.

The coupling terminal part 550 is connected to the external connection terminal part 510 via the step part 560. When an electricity storage unit is formed by a plurality of electricity storage modules 1, the coupling terminal part 550 is coupled to the second external output terminal 600 of the right adjacent electricity storage module 1 by a fixing bolt 940. An insertion hole 551 through which a fixing bolt 940 is passed is formed in the coupling terminal part 550. The step part 560 extends obliquely upward from the external connection terminal part 510 toward the coupling terminal part 550 so as to produce, between the external connection terminal part 510 and the coupling terminal part 550, a step that makes the coupling terminal part 550 higher by the plate thickness of the second external output terminal 600.

The second external output terminal 600 includes an external connection terminal part 610, a lead terminal connection part 620, a first fixation part 630, and a second fixation part 640. The external connection terminal part 610 is formed in a substantially square shape, and has an insertion hole 611 through which a fixing bolt 940 is passed. The lead terminal connection part 620 is provided on the front side of the external connection terminal part 610. The lead terminal connection part 620 is formed so as to stand substantially perpendicular with respect to the external connection terminal part 610, and extends along the extending direction of the positive electrode lead terminal 140 and the negative electrode lead terminal 150. At a connection face 621 of the lead terminal connection part 620, a center portion thereof bulges toward the external connection terminal part 610 side, thereby forming a projection 622. The first fixation part 630 extends forward from the external connection terminal part 610a at the left side relative to the lead terminal connection part 620. The first fixation part 630 has, at a leading end portion thereof, an insertion hole 631 through which a holder fixing screw 920 is passed. The second fixation part 640 extends rightward from the external connection terminal part 610. The second fixation part 640 has, at a leading end portion thereof, an insertion hole 641 through which a terminal fixing screw 930 is passed.

Each relay connection terminal 700 includes a terminal body part 710 and two lead terminal connection parts 720. A center portion of the terminal body part 710 is provided with a fixation part 711, having a substantially square shape, which is obtained by expanding the width in the front-rear direction of the terminal body part 710. An insertion hole 712 through which a terminal fixing screw 930 is passed is formed in the fixation part 711. The lead terminal connection parts 720 are formed so as to stand substantially perpendicular with respect to the terminal body part 710, at both end portions in the left-right direction of the terminal body part 710 and at one edge in the front-rear direction. The lead terminal connection parts 720 extend along the extending direction of the positive electrode lead terminal 140 and the negative electrode lead terminal 150. At a connection face 721 of each lead terminal connection part 720, a center portion thereof bulges toward a side opposite to the terminal body part 710, thereby forming projection 722.

In the terminal holder 400, the first external output terminal 500 is fixed to the first terminal mounting part 410 by a terminal fixing screw 930. At this time, the first external output terminal 500 is received in the first terminal mounting part 410 which is recessed. Then, a terminal fixing screw 930 is passed through the insertion hole 541 of the second fixation part 540, and is fastened into the first mounting hole 412 of the first terminal mounting part 410. The first terminal mounting part 410 is formed in a shape of the portion to be received in the first terminal mounting part 410 of the first external output terminal 500. In the first external output terminal 500 fitted in the first terminal mounting part 410, movements into the front-rear and left-right directions, i.e., into directions along the surface of the terminal holder 400, are restricted. Thus, when the terminal fixing screw 930 is to be fastened or when the terminal fixing screw 930 has been loosened, the first external output terminal 500 is less likely to move in the front-rear and left-right directions. In a state where the first external output terminal 500 is fixed to the first terminal mounting part 410, the insertion hole 511 of the external connection terminal part 510 is aligned with a bolt hole 441 of the nut 440. The external connection terminal part 510 of the first external output terminal 500 and the external connection terminal part 610 of the second external output terminal 600 are on the inner side of the terminal holder 400, whereas the coupling terminal part 550 of the first external output terminal 500 is in a state of protruding to the outer side (right side) of the terminal holder 400, in the direction (left-right direction) in which the first external output terminal 500 and the second external output terminal 600 are arranged.

Similarly, the second external output terminal 600 is fixed to the second terminal mounting part 420 by a terminal fixing screw 930. At this time, the second external output terminal 600 is received in the second terminal mounting part 420 which is recessed. Then, a terminal fixing screw 930 is passed through the insertion hole 641 of the second fixation part 640, and is fastened into the second mounting hole 422 of the second terminal mounting part 420. The second terminal mounting part 420 is formed in a shape of the second external output terminal 600. The second external output terminal 600 fitted in the second terminal mounting part 420 has movements into the front-rear and left-right directions restricted, and thus, is less likely to move in the front-rear and left-right directions when the terminal fixing screw 930 is to be fastened or when the terminal fixing screw 930 has been loosened. In a state where the second external output terminal 600 is fixed to the second terminal mounting part 420, the insertion hole 611 of the external connection terminal part 610 is aligned with the bolt hole 441 of the nut 440.

Similarly, each relay connection terminal 700 is fixed to a corresponding third terminal mounting part 430 by a terminal fixing screw 930. At this time, the relay connection terminal 700 is received in the third terminal mounting part 430 which is recessed. Then, a terminal fixing screw 930 is passed through the insertion hole 712 of the fixation part 711, and is fastened into the third mounting hole 431 of the third terminal mounting part 430. The third terminal mounting part 430 has a rectangular shape, and the dimensions thereof in the front-rear and left-right directions are respectively substantially equal to the maximum dimensions in the front-rear and left-right directions of the terminal body part 710 of the relay connection terminal 700. Therefore, the relay connection terminal 700 fitted in the third terminal mounting part 430 has movements into the front-rear and left-right directions restricted, and thus, is less likely to move in front-rear and left-right directions when the terminal fixing screw 930 is to be fastened or when the terminal fixing screw 930 has been loosened. The center relay connection terminal 700 is fixed in an orientation reversed, in the front-rear direction, to the orientation of the left and right relay connection terminals 700.

When the first external output terminal 500, the second external output terminal 600, and the relay connection terminals 700 are mounted to the terminal holder 400, a state is established in which the lead terminal connection parts 520, 620, 720 of the first external output terminal 500, the second external output terminal 600, and the relay connection terminals 700 are positioned near the pairs of terminal insertion holes 460.

When an electricity storage module 1 is to be assembled, four electricity storage devices 100 are attached to the device holder 200, first. At this time, the angle in the circumferential direction of each electricity storage device 100 is adjusted such that the positions of the positive electrode lead terminal 140 and the negative electrode lead terminal 150 drawn from the electricity storage device 100 attached to the device holder 200 are aligned to the positions of a pair of through-holes 301 of the circuit board 300 attached to the device holder 200 and a pair of terminal insertion holes 460 of the terminal holder 400 attached to the device holder 200.

The double-sided adhesive tape 800 affixed to the peripheral face of each electricity storage device 100 is opposed to the front face of a corresponding accommodation part 210 of the device holder 200 in a state where the angle of the electricity storage device 100 is adjusted. As shown in FIG. 5C and FIG. 6B, when each electricity storage device 100 is accommodated in a corresponding accommodation part 210, the double-sided adhesive tape 800 comes into close contact with substantially the entirety of the semicircular arc face 212 in the second region 211b of the inner face 211 of the accommodation part 210. Accordingly, the semicircular arc face 212 in the second region 211b and the peripheral face of the electricity storage device 100 opposed to the semicircular arc face 212 are joined (adhered) by the double-sided adhesive tape 800.

Here, as shown in FIG. 6B, at the peripheral face of the electricity storage device 100, i.e., at the peripheral face of the container 110, when the narrowed part 111 is formed through narrowing processing, upper and lower peripheral portions 112 with respect to the narrowed part 111 are deformed, whereby the peripheral portions 112 slightly bulge compared to the other portion of the peripheral face of the container 110. When the electricity storage device 100 is accommodated in an accommodation part 210, the narrowed part 111 and the peripheral portions 112 are opposed to the first region 211a in the inner face 211 of the accommodation part 210. Between the first region 211a and the second region 211b, the step 214 having a size not less than the bulge of the peripheral portions 112 is provided. As shown in FIG. 6A, the accommodation space S1 of the accommodation part 210 in the first region 211a is greater than the accommodation space S2 of the accommodation part 210 in the second region 211b, by an amount corresponding to the step 214 between the first region 211a and the second region 211b. Therefore, the peripheral face of the electricity storage device 100 can be inhibited from tilting with respect to the semicircular arc face 212 in the second region 211b. Thus, the double-sided adhesive tape 800 can be reliably brought into close contact with the peripheral face of the electricity storage device 100 and the inner face 211 (the semicircular arc face 212) of the accommodation part 210.

Further, as shown in FIG. 5C, a peripheral face portion, of the electricity storage device 100, on the side opposite to the peripheral face portion that has been joined to the inner face 211 (the semicircular arc face 212) of the accommodation part 210 is supported by the pairs of claw parts 215. Thus, movement of the electricity storage device 100 in a direction in which the electricity storage device 100 is detached from the accommodation part 210 is prevented. When the electricity storage device 100 is to be accommodated in an accommodation part 210, each pair of claw parts 215 are elastically deformed so as to be expanded outwardly by being pushed from the front by the peripheral face of the electricity storage device 100. Accordingly, the electricity storage device 100 can be passed through the pairs of claw parts 215 to be accommodated in the accommodation part 210.

Further, as shown in FIG. 7, in the present embodiment, the four electricity storage devices 100 are attached to the device holder 200 with the angles in the circumferential direction adjusted so as to realize the following configuration. That is, when viewed in the up-down direction, i.e., in the extending direction of the positive electrode lead terminal 140 and the negative electrode lead terminal 150, each connection line L that connects a positive electrode lead terminal 140 and a negative electrode lead terminal 150 is inclined by a predetermined angle (for example, the angle at the acute angle side is 45 degrees) with respect to an array direction D of the electricity storage devices 100, and the connection lines L in adjacent two electricity storage devices 100 are respectively inclined to opposite sides with respect to the array direction D. Accordingly, as indicated by broken lines in FIG. 9A, in the circuit board 300, between the connection lines L of adjacent electricity storage devices 100, a region having a large width in a direction perpendicular to the array direction D can be secured. Thus, electronic components forming the electronic circuit part 303 and the like can be easily arranged on the circuit board 300. In addition, as indicated by broken lines in FIG. 9B, in the terminal holder 400, between the connection lines L of adjacent electricity storage devices 100, a region having a large width in a direction perpendicular to the array direction D can be secured. Thus, the relay connection terminals 700 and the like can be easily arranged on the terminal holder 400.

Further, as shown in FIG. 7, in the device holder 200, each opening portion 222 formed in the mounting plate 220 has a shape in which a rear edge 222a thereof extends along the connection line L of a corresponding electricity storage device 100. Accordingly, when each electricity storage device 100 is to be attached to the device holder 200, the positive electrode lead terminal 140 and the negative electrode lead terminal 150 are aligned with the rear edge 222a of the opening portion 222, whereby the angle in the circumferential direction of the electricity storage device 100 can be appropriately adjusted to the angle that is to be realized at the time of attachment thereof.

Next, the circuit board 300 is fixed to the mounting plate 220 of the device holder 200 by the board fixing screws 910. At this time, the board fixing screws 910 are passed through the insertion holes 305 of the circuit board 300 and are fastened into the mounting holes 223 of the mounting plate 220. The positive electrode lead terminal 140 and the negative electrode lead terminal 150 of each electricity storage device 100 are passed through a corresponding pair of through-holes 301, and are electrically connected to the pair of through-holes 301 by soldering. Accordingly, the positive electrode lead terminal 140 and the negative electrode lead terminal 150 are electrically connected to the electronic circuit part 303 of the circuit board 300.

Next, the terminal holder 400 to which the first external output terminal 500, the second external output terminal 600, and the three relay connection terminals 700 are attached is fixed to the mounting plate 220 of the device holder 200 by the holder fixing screws 920. At this time, at the right end of the terminal holder 400, a holder fixing screw 920 is passed through the insertion hole 531 of the first fixation part 530 of the first external output terminal 500 and the insertion hole 450 of the terminal holder 400, and is fastened into the mounting boss 221 of the mounting plate 220. As a result, the first external output terminal 500 is fixed to the terminal holder 400 also by the holder fixing screw 920. Similarly, at the left end of the terminal holder 400, a holder fixing screw 920 is passed through the insertion hole 631 of the first fixation part 630 of the second external output terminal 600 and the insertion hole 450 of the terminal holder 400, and is fastened into the mounting boss 221 of the mounting plate 220. As a result, the second external output terminal 600 is fixed to the terminal holder 400 also by the holder fixing screw 920. In the center portion of the terminal holder 400, a holder fixing screw 920 is passed through the insertion hole 450 of the terminal holder 400, and is fastened into the mounting boss 221 of the mounting plate 220. The positive electrode lead terminal 140 and the negative electrode lead terminal 150 of each electricity storage device 100 are passed through a corresponding pair of terminal insertion holes 460, and the leading end portions thereof protrude upward from the surface (upper face) of the terminal holder 400. In this manner, the electricity storage module 1 is assembled as shown in FIG. 1.

Figure 10A:
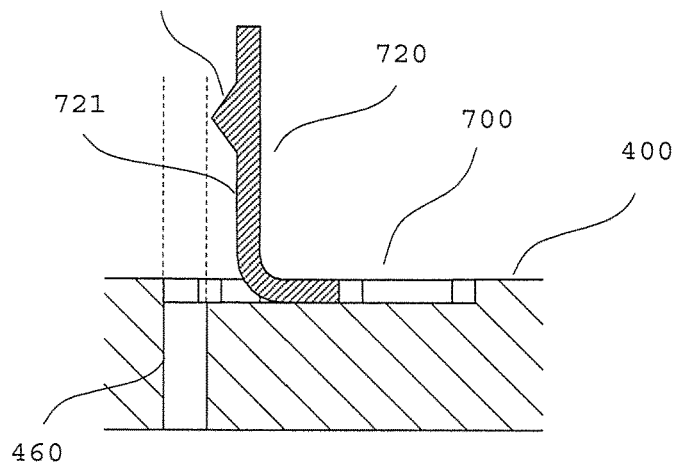
FIG. 10A to FIG. 10C are each a cross-sectional view of a main part of the terminal holder, taken along the front-rear direction at a position of a terminal insertion hole through which a positive electrode lead terminal of a leftmost electricity storage device is passed, according to the embodiment.
Figure 10B:
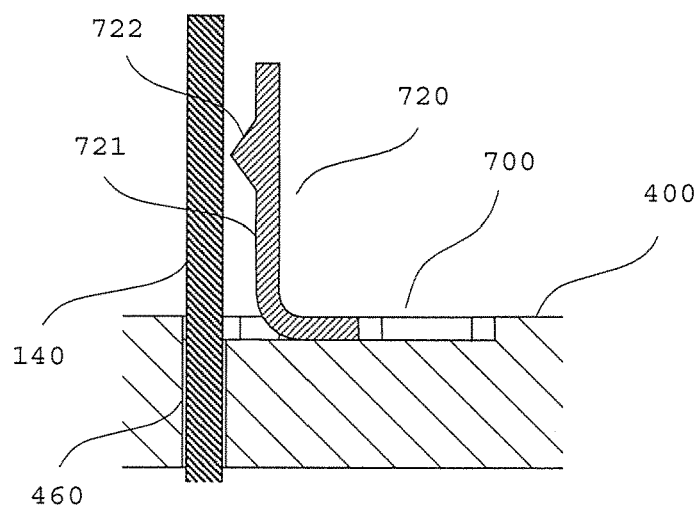
Figure 10C:
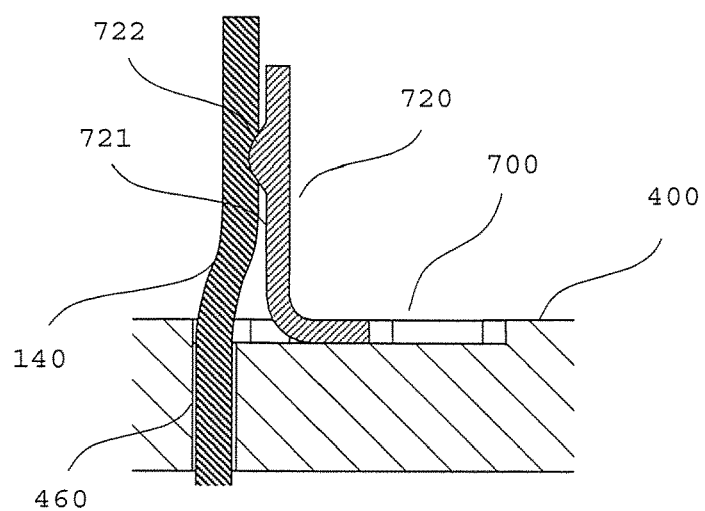

FIG. 10A to FIG. 10C are each a cross-sectional view of a main part of the terminal holder 400, taken along the front-rear direction at a position of the terminal insertion hole 460 through which the positive electrode lead terminal 140 of the leftmost electricity storage device 100 is passed, according to the present embodiment. FIG. 10A shows a state before the positive electrode lead terminal 140 is passed through the terminal insertion hole 460. FIG. 10B shows a state where the positive electrode lead terminal 140 is passed through the terminal insertion hole 460 and protrudes upward from the surface of the terminal holder 400. FIG. 10C shows a state where the positive electrode lead terminal 140 is joined to the lead terminal connection part 720 of the relay connection terminal 700.

The lead terminal connection part 720 in the relay connection terminal 700 is in a state where the connection face 721 is perpendicular to the surface of the terminal holder 400, i.e., the connection face 721 is along the extending direction in which the positive electrode lead terminal 140 extends from the electricity storage device 100. At this time, as indicated by broken lines in FIG. 10A, as for the projection 722 of the connection face 721 protruding toward the terminal insertion hole 460 side, when the terminal holder 400 is viewed in the up-down direction, i.e., in the extending direction, the terminal insertion hole 460 does not overlap the projection 722. Therefore, when the leading end portion of the positive electrode lead terminal 140 is caused to protrude above relative to the projection 722, the leading end portion of the positive electrode lead terminal 140 is less likely to collide with the projection 722, and the movement of the positive electrode lead terminal 140 is less likely to be hindered. As shown in FIG. 10B, the peripheral face of the positive electrode lead terminal 140 having protruded from the surface of the terminal holder 400 is in a state of being close to the projection 722 of the connection face 721.

This also applies to the other lead terminal connection parts 720 and the terminal insertion holes 460 corresponding thereto, the lead terminal connection part 520 of the first external output terminal 500 and the terminal insertion hole 460 corresponding thereto, and the lead terminal connection part 620 of the second external output terminal 600 and the terminal insertion hole 460 corresponding thereto. That is, the terminal insertion holes 460 do not overlap the projections 722, 522, 622, and movements of the positive electrode lead terminal 140 and the negative electrode lead terminal 150 are less likely to be hindered by the projections 722, 522, 622. The peripheral faces of the positive electrode lead terminal 140 and the negative electrode lead terminal 150 having protruded upward from the surface of the terminal holder 400 are in a state of being close to the projections 722, 522, 622.

An electrode rod for projection welding is placed on the positive electrode lead terminal 140 or the negative electrode lead terminal 150 so as to press toward the projection 722, 522, 622 side, whereby projection welding is performed between the projection 722, 522, 622 and the peripheral face of the positive electrode lead terminal 140 or the negative electrode lead terminal 150 being in contact therewith. For example, between the positive electrode lead terminal 140 of the leftmost electricity storage device 100 and the corresponding lead terminal connection part 720, as shown in FIG. 10C, in a state where the projection 722 has slightly entered the positive electrode lead terminal 140, the contact portions of both are fused and joined together. At this time, since a tip portion of the projection 722 is fused, the projecting amount of the projection 722 is reduced. Similar joined states are established between the other positive electrode lead terminals 140 and negative electrode lead terminals 150 and the lead terminal connection parts 520, 620, 720 corresponding thereto. As a result, the positive electrode lead terminal 140 and the negative electrode lead terminal 150 are connected and fixed to the lead terminal connection parts 520, 620, 720 corresponding thereto. Since the tip portion of the projection 522, 622, 722 enters the positive electrode lead terminal 140 or the negative electrode lead terminal 150, an anchor effect is expected, and rigid connections between the positive electrode lead terminal 140 and the negative electrode lead terminal 150, and the lead terminal connection parts 520, 620, 720 in the extending direction are expected to be realized.

Here, the external connection terminal part 510 of the first external output terminal 500 is positioned on the right side relative to the right lead terminal connection part 720 of the right relay connection terminal 700, whereas the position at which the first external output terminal 500 is fixed by a terminal fixing screw 930 is not near the external connection terminal part 510 but at the same position in the left-right direction as the position at which the right relay connection terminal 700 is fixed by a terminal fixing screw 930. That is, the terminal fixing screw 930 that fixes the first external output terminal 500 does not overlap the right lead terminal connection part 720 in the front-rear direction. Accordingly, when the right lead terminal connection part 720 of the right relay connection terminal 700 and the negative electrode lead terminal 150 of the rightmost electricity storage device 100 are to be joined by welding, the terminal fixing screw 930 that fixes the first external output terminal 500 does not become an obstacle. Similarly, the terminal fixing screw 930 that fixes the second external output terminal 600 does not overlap, in the front-rear direction, the left lead terminal connection part 720 of the left relay connection terminal 700. Accordingly, when the left lead terminal connection part 720 of the left relay connection terminal 700 and the positive electrode lead terminal 140 of the leftmost electricity storage device 100 are to be joined by welding, the terminal fixing screw 930 that fixes the second external output terminal 600 does not become an obstacle.

In FIG. 1, the fixing bolts 940 are fastened to the first external output terminal 500 and the second external output terminal 600. However, when no external terminal is connected to the first external output terminal 500 and the second external output terminal 600, the fixing bolts 940 may be removed. At the rear of the lead terminal connection part 520 of the first external output terminal 500, the fixing bolt 940 on the first external output terminal 500 side mounted to the terminal holder 400 overlaps the lead terminal connection part 520 in the front-rear direction. In addition, at the rear of the lead terminal connection part 620 of the second external output terminal 600, the fixing bolt 940 at the second external output terminal 600 side mounted to the terminal holder 400 overlaps the lead terminal connection part 620 in the front-rear direction. Joining of the lead terminal connection part 520 and the positive electrode lead terminal 140 of the electricity storage device 100 and joining of the lead terminal connection part 620 and the negative electrode lead terminal 150 of the electricity storage device 100 are performed from the rear. Therefore, in a case where the fixing bolts 940 are mounted to the terminal holder 400 before an external terminal is connected, in order not to hinder the joining of the lead terminal connection part 520 and the positive electrode lead terminal 140, the fixing bolt 940 at the first external output terminal 500 side is mounted after the joining thereof has been performed. In addition, in order not to hinder the joining of the lead terminal connection part 620 and the negative electrode lead terminal 150, the fixing bolt 940 at the second external output terminal 600 side is mounted after the joining thereof has been performed.

In this manner, the electricity storage module 1 is completed. When the electricity storage module 1 is mounted to an external apparatus, an external terminal on the positive electrode side of the external apparatus is connected to the external connection terminal part 510 of the first external output terminal 500 by a fixing bolt 940, and an external terminal on the negative electrode side from the external apparatus is connected to the external connection terminal part 610 of the second external output terminal 600 by a fixing bolt 940. Electric power stored in each electricity storage device 100 is supplied to the external apparatus through the first external output terminal 500 and the second external output terminal 600.

<Configuration of Electricity Storage Unit>

An electricity storage unit can be formed by combining a plurality of electricity storage modules 1. In the following, as one example, an electricity storage unit 10 formed by two electricity storage modules 1 is described. Similar to the electricity storage unit 10, by coupling the electricity storage modules 1, it is possible to realize an electricity storage unit combining three or more electricity storage modules 1.

Figure 11:
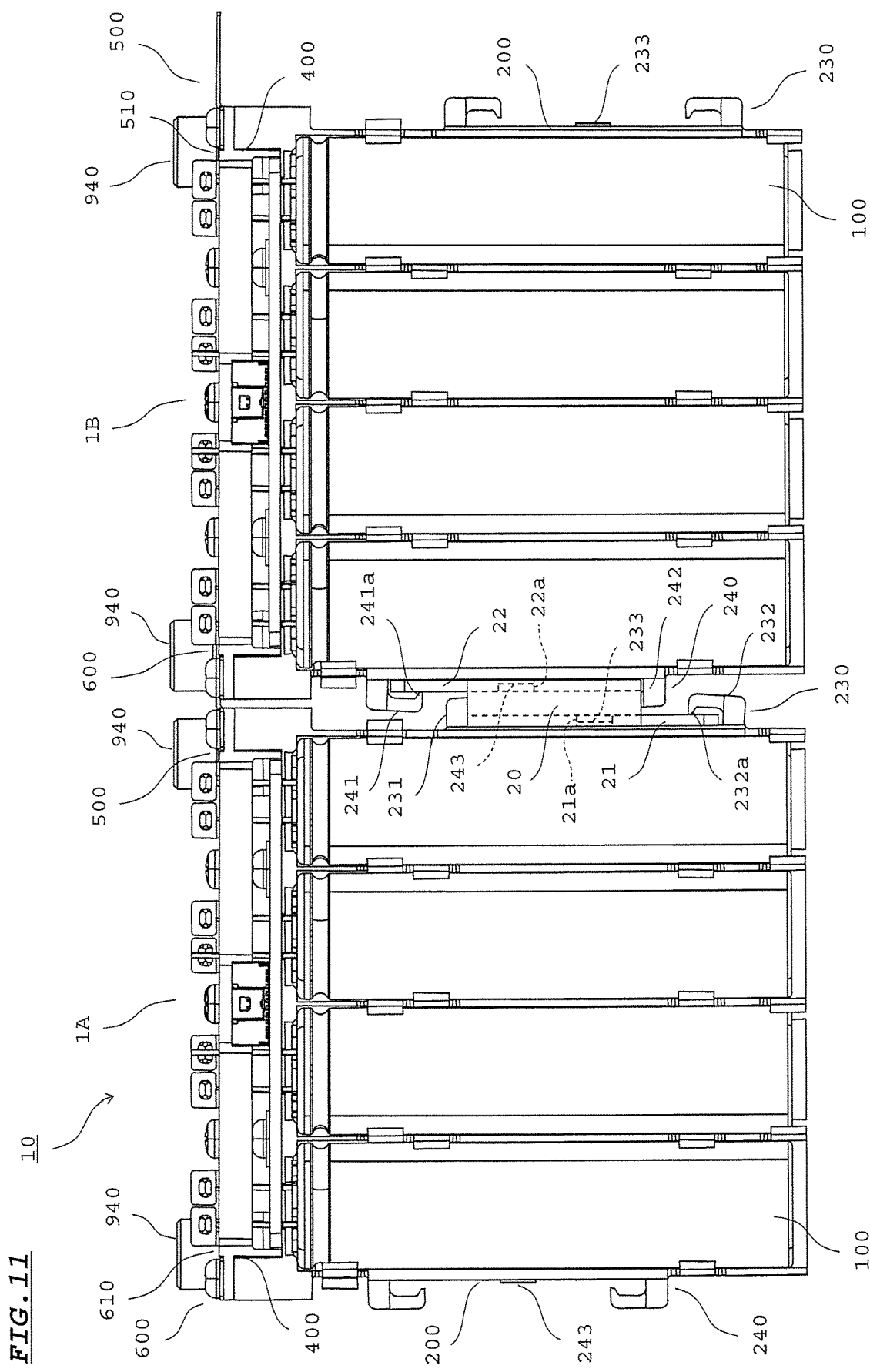
FIG. 11 is a front view of an electricity storage unit according to the embodiment.

FIG. 11 is a front view of the electricity storage unit 10.

The electricity storage unit 10 includes two electricity storage modules 1 and a coupling member 20 for coupling these electricity storage modules 1. Hereinafter, for convenience of description, the electricity storage module 1 on the left side and the electricity storage module 1 on the right side shown in FIG. 11 will be referred to as a first electricity storage module 1A and a second electricity storage module 1B, respectively. The first electricity storage module 1A and the second electricity storage module 1B are arranged in a direction in which four electricity storage devices 100 are arranged in a row and in which the first external output terminal 500 and the second external output terminal 600 are arranged.

Figure 12A:
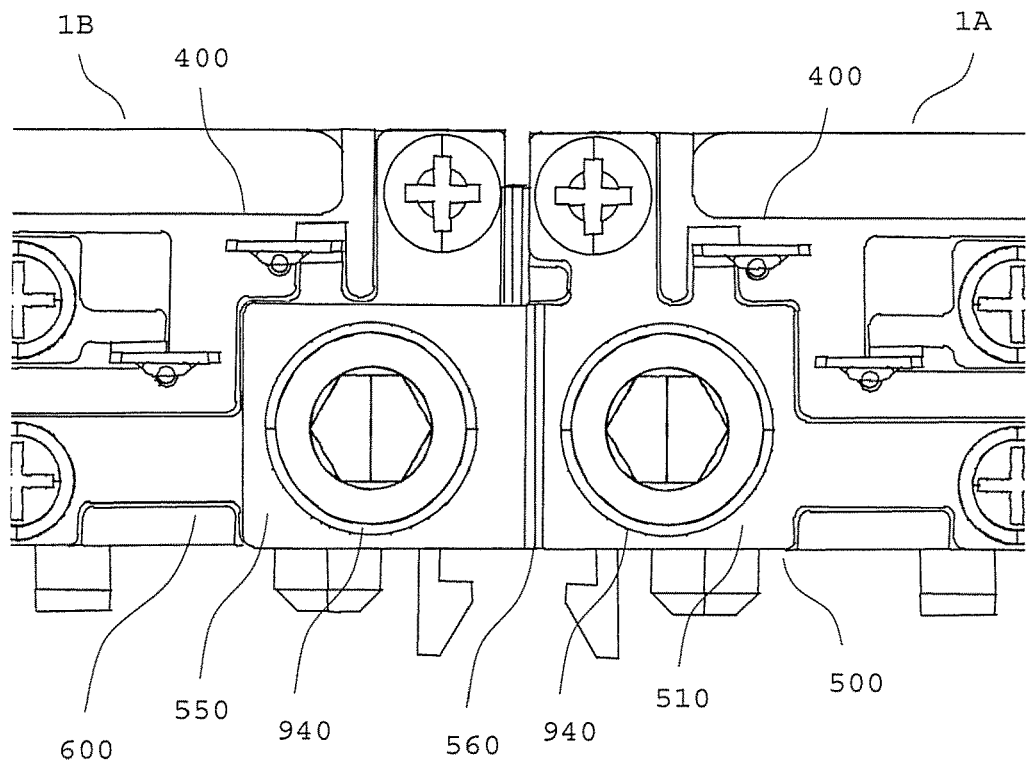
FIGS. 12A and 12B are respectively a plan view and a rear view of a main part of the electricity storage unit showing a connection portion between the first external output terminal of a first electricity storage module and the second external output terminal of a second electricity storage module according to the embodiment.
Figure 12B:
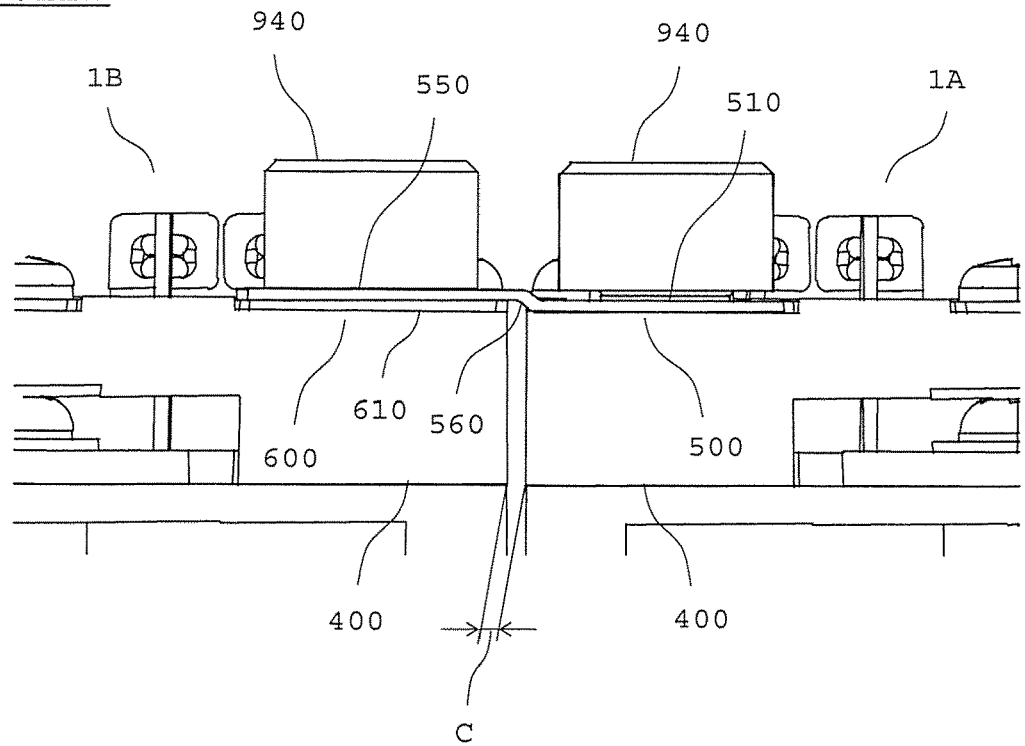

FIGS. 12A and 12B are respectively a plan view and a rear view of a main part of the electricity storage unit 10 showing a connection portion between the first external output terminal 500 of the first electricity storage module 1A and the second external output terminal 600 of the second electricity storage module 1B.

The coupling terminal part 550 of the first external output terminal 500 of the first electricity storage module 1A is overlaid from above on the external connection terminal part 610 of the second external output terminal 600 of the second electricity storage module 1B. Accordingly, the insertion hole 551 of the coupling terminal part 550 and the insertion hole 611 of the external connection terminal part 610 are aligned with each other. A fixing bolt 940 is passed through the two insertion holes 551, 611 and fastened into the nut 440. Accordingly, the coupling terminal part 550 and the external connection terminal part 610 are connected to each other. Here, in the electricity storage module 1, the external connection terminal part 510 of the first external output terminal 500 and the external connection terminal part 610 of the second external output terminal 600 are at the same height on the terminal holder 400. In addition, the coupling terminal part 550 of the first external output terminal 500 is at a position higher than the external connection terminal part 510 by the thickness of the external connection terminal part 610 due to the step part 560. That is, the lower face of the coupling terminal part 550 and the upper face of the external connection terminal part 610 are at the same height position in the up-down direction. Therefore, in a state where the coupling terminal part 550 is connected to the external connection terminal part 610, the height of the first electricity storage module 1A and the height of the second electricity storage module 1B are equal to each other as shown in FIG. 11. There is a slight clearance C of, for example, about 1 mm between the terminal holder 400 of the first electricity storage module 1A and the terminal holder 400 of the second electricity storage module 1B.

In FIG. 11 to FIG. 12B, a fixing bolt 940 is fastened into the external connection terminal part 510 of the first external output terminal 500 of the first electricity storage module 1A, but this fixing bolt 940 may be removed.

The coupling member 20 couples the first coupling part 230 of the first electricity storage module 1A and the second coupling part 240 of the second electricity storage module 1B.

Figure 13A:
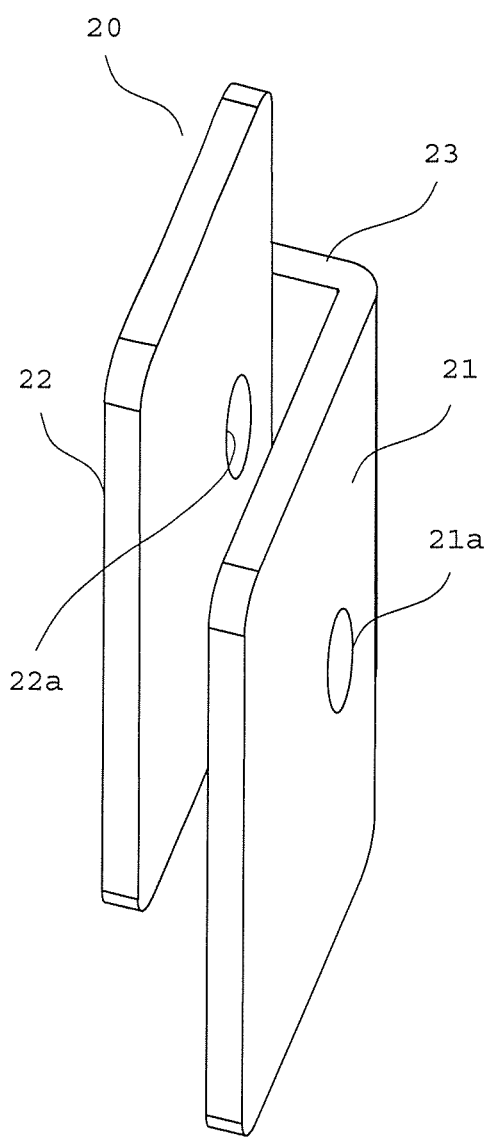
FIG. 13A is a perspective view of a coupling member according to the embodiment.
Figure 13B:
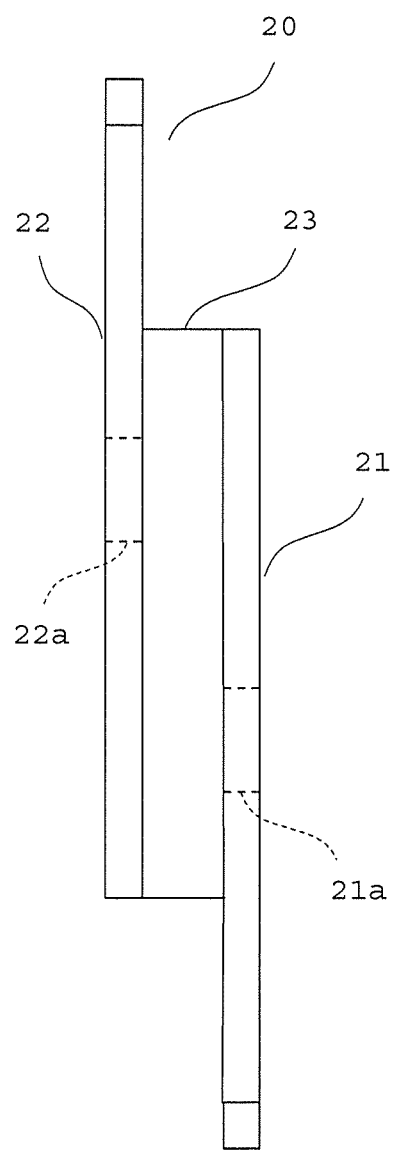
FIG. 13B is a front view of the coupling member according to the embodiment.
Figure 14A:
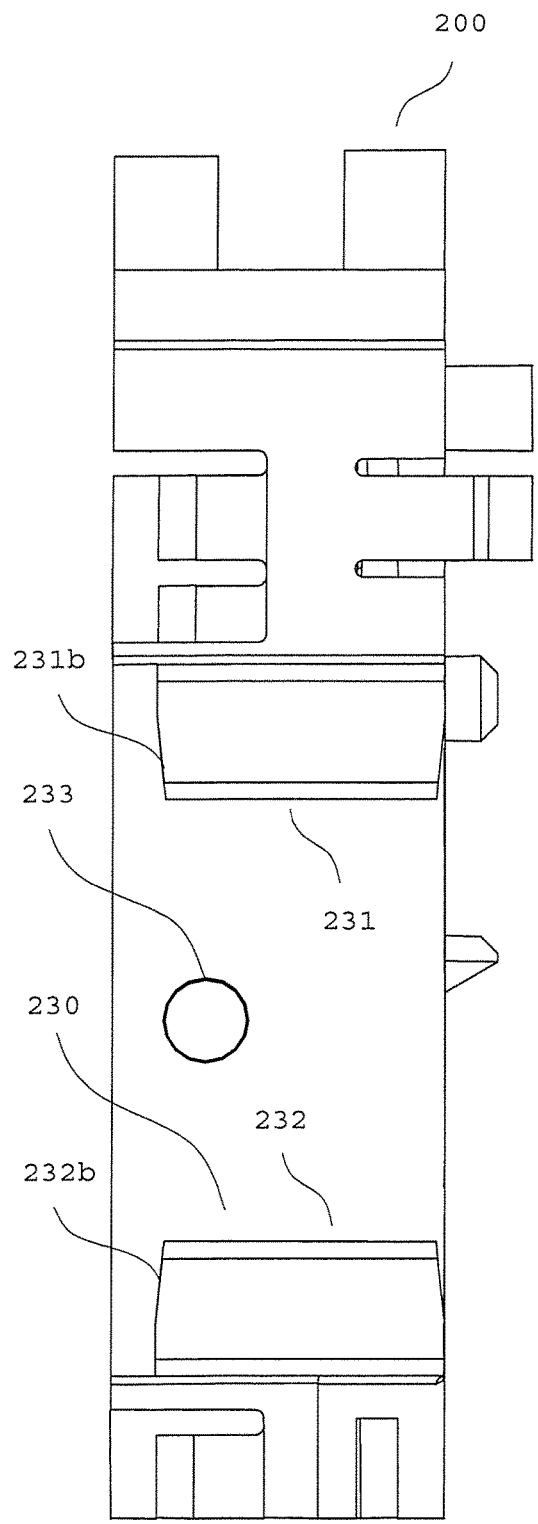
FIG. 14A is a right side view of the device holder according to the embodiment.
Figure 14B:
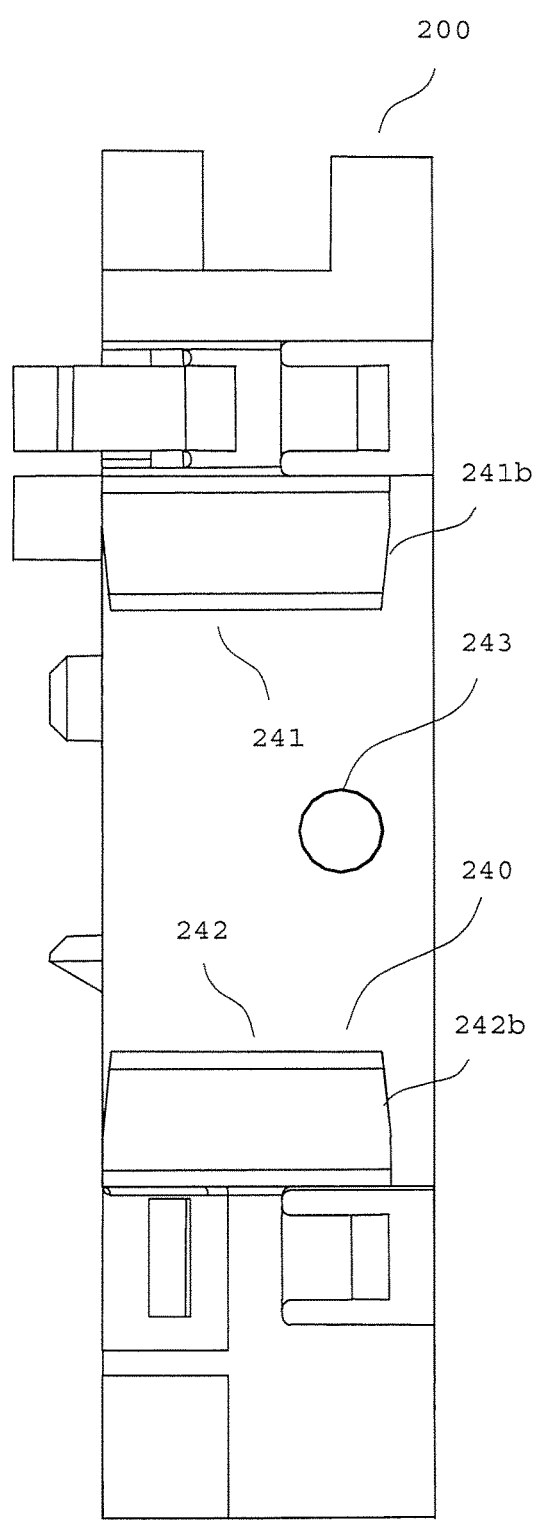
FIG. 14B is a left side view of the device holder according to the embodiment.

FIG. 13A is a perspective view of the coupling member 20, and FIG. 13B is a front view of the coupling member 20. FIG. 14A is a right side view of the device holder 200 and FIG. 14B is a left side view of the device holder 200.

As shown in FIGS. 13A and 13B, the coupling member 20 is formed from a metal material, and includes: a first insertion plate 21 having a quadrate shape; a second insertion plate 22 having a quadrate shape and disposed in parallel to the first insertion plate 21; and a connection plate 23 connecting the first insertion plate 21 and the second insertion plate 22. The positions of the first insertion plate 21 and the second insertion plate 22 are shifted with respect to each other in the up-down direction so as to correspond to the first coupling part 230 of the first electricity storage module 1A and the second coupling part 240 of the second electricity storage module 1B. That is, the position of the second insertion plate 22 is set to be higher than the position of the first insertion plate 21. The first insertion plate 21 and the second insertion plate 22 have respectively formed therein a circular first hole part 21a and a circular second hole part 22a at positions that are at center portions in the up-down direction and that are closer to the connection plate 23 side.

As shown in FIG. 14A, on the right side face of the device holder 200, a circular first protruding part 233 is formed at a position closer to the front and between the upper claw part 231 and the lower claw part 232 of the first coupling part 230. The outer diameter of the first protruding part 233 is slightly smaller than the inner diameter of the first hole part 21a. In the first coupling part 230, the upper claw part 231 and the lower claw part 232 respectively have an upper inclined face 231b and a lower inclined face 232b which are each inclined backward. Similarly, as shown in FIG. 14B, on the left side face of the device holder 200, a circular second protruding part 243 is formed at a position closer to the front and between the upper claw part 241 and the lower claw part 242 of the second coupling part 240. The outer diameter of the second protruding part 243 is slightly smaller than the inner diameter of the second hole part 22a. In the second coupling part 240, the upper claw part 241 and the lower claw part 242 respectively have an upper inclined face 241b and a lower inclined face 242b which are each inclined backward.

As shown in FIG. 11, the first insertion plate 21 of the coupling member 20 is inserted between the upper claw part 231 and the lower claw part 232 of the first coupling part 230 of the first electricity storage module 1A and the second insertion plate 22 of the coupling member 20 is inserted between the upper claw part 241 and the lower claw part 242 of the second coupling part 240 of the second electricity storage module 1B. At this time, the protrusion 231a of the upper claw part 231 and the protrusion 232a of the lower claw part 232 of the first coupling part 230 are pushed outwardly by the first insertion plate 21, whereby the upper claw part 231 and the lower claw part 232 are elastically deformed outwardly. Similarly, the protrusion 241a of the upper claw part 241 and the protrusion 242a of the lower claw part 242 of the second coupling part 240 are pushed outwardly by the second insertion plate 22, whereby the upper claw part 241 and lower claw part 242 are elastically deformed outwardly. Due to the force generated by these elastic deformations, the first insertion plate 21 is strongly pressed against the side face of the device holder 200 of the first electricity storage module 1A, and the second insertion plate 22 is strongly pressed against the side face of the device holder 200 of the second electricity storage module 1B. In addition, the first protruding part 233 at the right side face of the device holder 200 is fitted into the first hole part 21a of the first insertion plate 21, and the second protruding part 243 at the left side face of the device holder 200 is fitted into the second hole part 22a of the second insertion plate 22. This makes it difficult for the coupling member 20 to be detached from the first coupling part 230 and the second coupling part 240.

Since the upper inclined face 231b and the lower inclined face 232b are formed in the upper claw part 231 and the lower claw part 232 in the first coupling part 230, when the first insertion plate 21 is to be inserted between the upper claw part 231 and the lower claw part 232 while pushing the protrusion 231a of the upper claw part 231 and the protrusion 232a of the lower claw part 232 to be expanded, the insertion of the first insertion plate 21 is facilitated. Similarly, since the upper inclined face 241b and the lower inclined face 242b are formed in the upper claw part 241 and the lower claw part 242 in the second coupling part 240, when the second insertion plate 22 is to be inserted between the upper claw part 241 and the lower claw part 242 while pushing the protrusion 241a of the upper claw part 241 and the protrusion 242a of the lower claw part 242 to be expanded, the insertion of the second insertion plate 22 is facilitated.

As a result of the first coupling part 230 and the second coupling part 240 being coupled by the coupling member 20 in this manner, the first electricity storage module 1A and the second electricity storage module 1B are coupled to each other.

Here, the position of the first coupling part 230 of the first electricity storage module 1A and the position of the second coupling part 240 of the second electricity storage module 1B are shifted with respect to each other in the up-down direction when viewed in the arrangement direction of the first electricity storage module 1A and the second electricity storage module 1B (left-right direction). Thus, when viewed in a direction (up-down direction) orthogonal to this arrangement direction, the first coupling part 230 and the second coupling part 240 are partially overlap each other. That is, the lower claw part 242 of the second coupling part 240 is positioned between the upper claw part 231 and the lower claw part 232 of the first coupling part 230, and the upper claw part 231 of the first coupling part 230 is positioned between the upper claw part 241 and the lower claw part 242 of the second coupling part 240. Thus, the first electricity storage module 1A and the second electricity storage module 1B can be coupled to each other in a small space in the arrangement direction.

In the electricity storage unit 10, an external terminal on the positive electrode side from an external apparatus is connected by a fixing bolt 940 to the external connection terminal part 510 of the first external output terminal 500 of the second electricity storage module 1B, and an external terminal on the negative electrode side from the external apparatus is connected by a fixing bolt 940 to the external connection terminal part 610 of the second external output terminal 600 of the first electricity storage module 1A. Electric power generated by a total of eight electricity storage devices 100 of the first electricity storage module 1A and the second electricity storage module 113 is supplied to the external apparatus through the first external output terminal 500 of the second electricity storage module 1B and the second external output terminal 600 of the first electricity storage module 1A. A voltage of 12 V, for example, is outputted from a single electricity storage module 1. Thus, for example, when a voltage of 24 V is necessary for an external apparatus, the electricity storage unit 10 formed by two electricity storage modules 1 is used.

Also when a single electricity storage module 1 is used, the coupling terminal part 550 of the first external output terminal 500 may be provided. Alternatively, when a single electricity storage module 1 is used, the coupling terminal part 550 of the first external output terminal 500 may be cut off. In the electricity storage unit 10, the first external output terminal 500 that is not connected to the second external output terminal 600 of an adjacent electricity storage module 1 but is connected to an external terminal, the coupling terminal part 550 may be cut off.

Effect of Embodiment

According to the present embodiment, the following effects are exhibited.

In a case where a plurality, e.g., two, of electricity storage modules 1 are combined to form an electricity storage unit 10, the coupling terminal part 550 protruding to the outer side of the terminal holder 400 of the first external output terminal 500 of one electricity storage module 1 (first electricity storage module 1A) is connected to the external connection terminal part 610 being on the inner side of the terminal holder 400 of the second external output terminal 600 of the other electricity storage module 1 (second electricity storage module 113). Thus, the interval between adjacent two electricity storage modules 1 can be reduced. Accordingly, the size of the electricity storage unit 10 can be made compact in the direction in which the plurality of electricity storage modules 1 are arranged.

When an external terminal from an external apparatus is to be connected to the first external output terminal 500, the external terminal can be connected not to the coupling terminal part 550 protruding from the terminal holder 400, but to the external connection terminal part 510 being on the inner side of the terminal holder 400. Thus, the external terminal can be firmly connected to the first external output terminal 500.

Further, in the terminal holder 400, the nut 440 is embedded at the position where the external connection terminal part 610 of the second external output terminal 600 is attached. Thus, when a fixing bolt 940 is fastened to the nut 440, the external terminal or the coupling terminal part 550 of the first external output terminal 500 can be rigidly fixed to the external connection terminal part 610. Similarly, in the terminal holder 400, the nut 440 is also embedded at the position where the external connection terminal part 510 of the first external output terminal 500 is attached. Thus, when a fixing bolt 940 is fastened to the nut 440, the external terminal can be rigidly fixed to the external connection terminal part 510.

Further, the coupling terminal part 550 of the first external output terminal 500 is at a position higher than the external connection terminal part 510 by the thickness of the external connection terminal part 610 due to the step part 560. In a state where the coupling terminal part 550 is connected to the external connection terminal part 610, the height of the first electricity storage module 1A and the height of the second electricity storage module 1B are equal to each other. Accordingly, when the electricity storage unit 10 is installed at a predetermined installation section, the electricity storage unit 10 is less likely to tilt with respect to the installation face of the installation section.

Further, adjacent two electricity storage modules 1 are coupled to each other such that the clearance C is produced between the terminal holders 400 of the electricity storage modules 1. Thus, different from a case where the terminal holders 400 are in contact with each other, even if vibration and the like occur in the electricity storage unit 10, unusual noise would not be generated between the two terminal holders 400.

Further, the first coupling part 230 and the second coupling part 240 are allowed to overlap each other in the arrangement direction of two electricity storage modules 1. Thus, by use of the first coupling part 230, the second coupling part 240, and the coupling member 20, the first electricity storage module 1A and the second electricity storage module 1B can be coupled to each other in a small space in the arrangement direction. Accordingly, the size of the electricity storage unit 10 can be made compact in the direction in which a plurality of electricity storage modules 1 are arranged.

Further, in the inner face 211 of each accommodation part 210 of the device holder 200, the step 214 is provided between the first region 211a and the second region 211b, and the accommodation space S1 of the accommodation part 210 in the first region 211a is greater than the accommodation space S2 of the accommodation part 210 in the second region 211b. Therefore, the peripheral face of the electricity storage device 100 is less likely to tilt with respect to the inner face 211 in the second region 211b. Thus, the double-sided adhesive tape 800 can be firmly brought into close contact with the peripheral face of the electricity storage device 100 and the inner face 211 of the accommodation part 210, whereby rigid joining by the double-sided adhesive tape 800 can be realized. Therefore, the electricity storage device 100 can be firmly held by the device holder 200.

In particular, each electricity storage device 100 is structured so as to allow electric power to be drawn by the positive electrode lead terminal 140 and the negative electrode lead terminal 150. In addition, the positive electrode lead terminal 140 and the negative electrode lead terminal 150 are each formed as a thin conductive wire of which the strength is not very high. Thus, if the electricity storage devices 100 easily move when vibration and the like have occurred in a state where the leading end portions of the positive electrode lead terminals 140 and the negative electrode lead terminals 150 are fixed to the first external output terminal 500, the second external output terminal 600, and the relay connection terminals 700, the positive electrode lead terminals 140 and the negative electrode lead terminals 150 could be easily broken or cut. Since the electricity storage devices 100 are firmly held by the device holder 200 as described above, occurrence of damages of the positive electrode lead terminals 140 and the negative electrode lead terminals 150 can be reduced.

Further, the double-sided adhesive tape 800 is configured as an acrylic adhesive formed in a sheet shape. Thus, due to high adhesion by the acrylic adhesive, rigid joining by the double-sided adhesive tape 800 can be realized between the peripheral face of the electricity storage device 100 and the inner face 211 of the accommodation part 210. Different form a rubber-based adhesive, environmental degradation is less likely caused in an acrylic adhesive. Thus, joining force is less likely to be reduced in association with a lapse of the use period. Further, since the double-sided adhesive tape 800 does not include any base material, the double-sided adhesive tape 800 can be made thin accordingly. Thus, the unity of the electricity storage device 100 and the device holder 200 can be easily realized, the electricity storage device 100 can be made less likely to move, and the resistance to vibration can be enhanced.

Further, the device holder 200 includes pairs of claw parts 215 that support the electricity storage devices 100 so as not to move in a direction in which the electricity storage devices 100 are detached from the accommodation parts 210. Thus, even when the adhesion (joining force) of the double-sided adhesive tape 800 is reduced due to aged deterioration, each electricity storage device 100 can be held in the accommodation part 210.

Further, the positive electrode lead terminals 140 and the negative electrode lead terminals 150 of the electricity storage devices 100 held by the device holder 200 can be, in the extending direction of these lead terminals 140, 150, electrically connected to the first external output terminal 500, the second external output terminal 600, and the relay connection terminals 700 that are attached to the terminal holder 400, and also electrically connected to the electronic circuit part 303 that includes a balancing circuit and the like and that is disposed on the circuit board 300. At this time, since many regions of the circuit board 300 and the terminal holder 400 overlap in the extending direction, the size of the electricity storage module 1 in the direction perpendicular to the extending direction can be made compact. In this case, if a configuration is employed in which the terminal holder 400 is disposed between the circuit board 300 and the device holder 200, a large space is required between the first external output terminal 500, the second external output terminal 600 and the relay connection terminals 700 on the terminal holder 400, and the circuit board 300 overlaid thereon. This space is a space for performing, after assembling the circuit board 300, the device holder 200, and the terminal holder 400, operation of joining the positive electrode lead terminals 140 and the negative electrode lead terminals 150 to the first external output terminal 500, the second external output terminal 600, and the relay connection terminals 700 (e.g., a space for inserting an electrode rod for projection welding, etc.). This could result in an increased side in the extending direction of the electricity storage module 1. In contrast, the present embodiment employs a configuration in which the circuit board 300 is disposed between the terminal holder 400 and the device holder 200. Therefore, the space between the electronic circuit part 303 and the like disposed on the circuit board 300, and the terminal holder 400 overlaid thereon can be reduced when compared with the space required in the case of the former configuration. Thus, the size in the extending direction of the electricity storage module 1 can be made compact.

As for the connector 302 of the circuit board 300, different from the first external output terminal 500, the second external output terminal 600, and the relay connection terminals 700 on the terminal holder 400, the region on the circuit board 300 occupied by the connector 302 is small. Therefore, if the terminal holder 400 is prevented from overlapping the region of the connector 302 as in the present embodiment, there is no need to take into consideration the space for inserting/pulling out an external connector into/from the connector 302, as the space that is required between the circuit board 300 and the terminal holder 400.

Further, the circuit board 300 is provided with, for each positive electrode lead terminal 140 and for each negative electrode lead terminal 150, a through-hole 301 through which the lead terminal 140, 150 is passed. In the through-holes 301, the positive electrode lead terminals 140 and the negative electrode lead terminals 150 are electrically connected to the electronic circuit part 303. Thus, the positive electrode lead terminals 140 and the negative electrode lead terminals 150 can be connected, at intermediate portions thereof, to the electronic circuit part 303 of the circuit board 300 in a favorable manner.

Further, the four electricity storage devices 100 are arrayed and held in the device holder 200 in the following manner. That is, when viewed in the extending direction of the positive electrode lead terminals 140 and the negative electrode lead terminals 150, each connection line L connecting a positive electrode lead terminal 140 and a negative electrode lead terminal 150 is inclined with respect to the array direction D of the electricity storage devices 100, and the connection lines L in adjacent two electricity storage devices 100 are respectively inclined to opposite sides with respect to the array direction D. Accordingly, in the circuit board 300, between the connection lines L in adjacent electricity storage device 100, a region having a large width in a direction perpendicular to the array direction D can be secured. Thus, electronic components forming the electronic circuit part 303 and the like can be easily arranged on the circuit board 300, and unnecessary increase in size of the circuit board 300 can be inhibited.

Further, since the temperature sensors 304 are disposed at positions near through-holes 301 of the circuit board 300, whether or not there are any overheat states of the electricity storage devices 100 can be monitored with a simple configuration.

Further, the terminal holder 400 is fixed not to the circuit board 300 but to the device holder 200 which is stronger than the circuit board 300. Thus, the terminal holder 400 can be rigidly fixed, and the resistance to vibration can be expected to be improved.

Further, the first external output terminal 500, the second external output terminal 600, and the relay connection terminals 700 are respectively received in the first terminal mounting part 410, the second terminal mounting part 420, and the third terminal mounting parts 430 so as to restrict movements into directions along the surface of the terminal holder 400, and are fixed into the terminal mounting parts 410, 420, 430 by the terminal fixing screws 930. Therefore, even if the terminal fixing screws 930 are loosened due to vibration and the like, the first external output terminal 500, the second external output terminal 600, and the relay connection terminals 700 are less likely to move in the first terminal mounting part 410, the second terminal mounting part 420, and the third terminal mounting parts 430, respectively. Thus, detachment of the positive electrode lead terminals 140 and the negative electrode lead terminals 150 from the connection faces 521, 621, 721 due to movements of the first external output terminal 500, the second external output terminal 600, and the relay connection terminals 700 is less likely to be caused.

Further, the first external output terminal 500, the second external output terminal 600, and the relay connection terminals 700 are configured such that the lead terminal connection parts 520, 620, 720 thereof extend along the extending direction of the positive electrode lead terminals 140 and the negative electrode lead terminals 150 from the electricity storage devices 100. Therefore, long portions of the peripheral faces of the positive electrode lead terminals 140 and the negative electrode lead terminals 150 are utilized, in the extending direction, to be connected to the lead terminal connection parts 520, 620, 720. Accordingly, the positive electrode lead terminals 140 and the negative electrode lead terminals 150 can be stably connected to the first external output terminal 500, the second external output terminal 600, and the relay connection terminals 700. Thus, electric power from the four electricity storage devices 100 can be stably supplied to the outside through the first external output terminal 500, the second external output terminal 600, and the relay connection terminals 700. In addition, the resistance to vibration can be expected to be improved.

Further, the projections 522, 622, 722 are formed in the lead terminal connection parts 520, 620, 720, and the peripheral faces of the positive electrode lead terminals 140 and the negative electrode lead terminals 150 are joined to the projections 522, 622 722. Thus, an anchor effect caused by the tip portions of the projections 522, 622, 722 entering the peripheral faces of the positive electrode lead terminals 140 and the negative electrode lead terminals 150 is expected. Thus, rigid connections between the positive electrode lead terminals 140 and the negative electrode lead terminals 150, and the lead terminal connection parts 520, 620, 720 in the extending direction are expected to be realized, thereby the resistance to vibration is expected to be improved.

Further, when the terminal holder 400 is viewed in the extending direction, each terminal insertion hole 460 does not overlap the projection 522, 622, 722 of the corresponding lead terminal connection part 520, 620, 720. Therefore, when the leading end portions of the positive electrode lead terminals 140 and the negative electrode lead terminals 150 passed through the terminal insertion holes 460 are caused to protrude above relative to the projections 522, 622, 722, the leading end portions are less likely to collide with the projections 522, 622, 722, and movement of the positive electrode lead terminals 140 and the negative electrode lead terminals 150 are less likely to be hindered.

Although an embodiment of the present invention has been described, the present invention is not limited to the above embodiment. Various application examples of the present invention can be made in addition to the above embodiment.

<Modification 1>

Figure 15A:
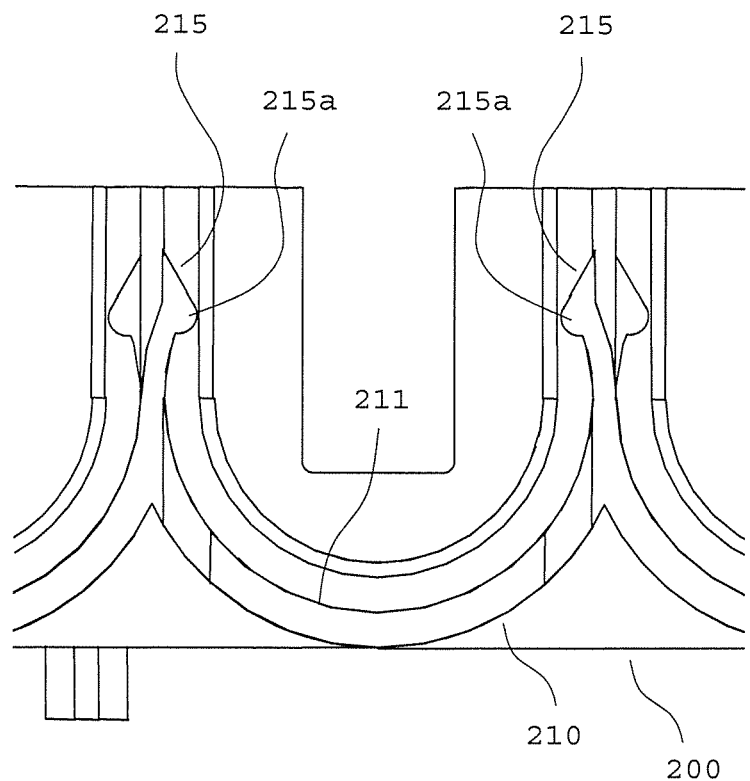
FIG. 15A is an enlarged view of a main part of a device holder according to Modification 1.
Figure 15B:
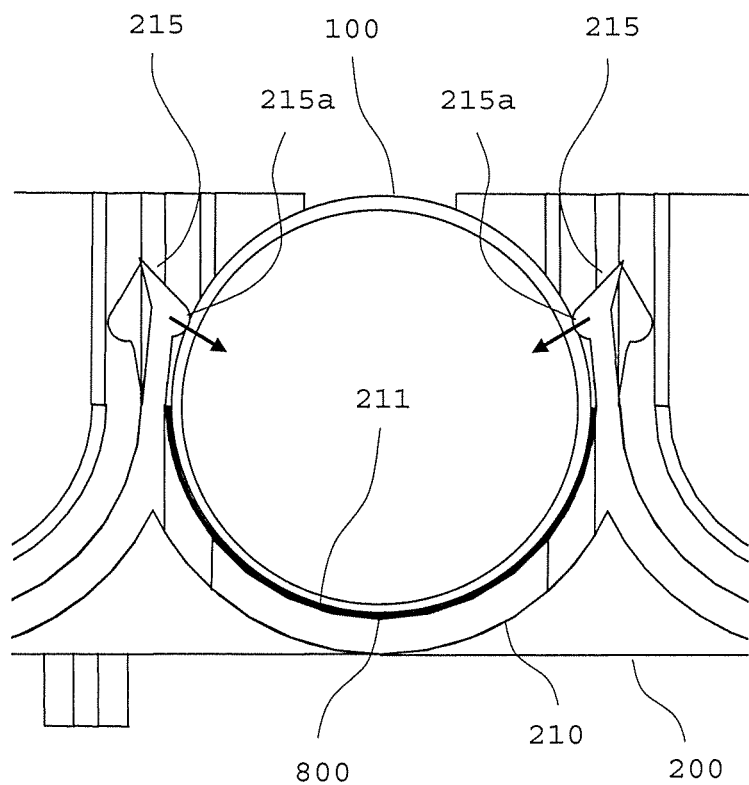
FIG. 15B is an enlarged view of a main part of the device holder having an electricity storage device attached thereto, according to Modification 1.

FIG. 15A is an enlarged view of a main part of a device holder 200 according to Modification 1. FIG. 15B is an enlarged view of a main part of the device holder 200 having an electricity storage device 100 attached thereto, according to Modification 1.

As shown in FIG. 15A, in the device holder 200 according to the present modification, projections 215a protruding toward the inner side of the accommodation part 210 are formed at leading end portions of a pair of claw parts 215. As shown in FIG. 15B, when an electricity storage device 100 is accommodated in an accommodation part 210, the pair of claw parts 215 come into contact with the peripheral face of the electricity storage device 100 accommodated in the accommodation part 210, and are elastically deformed so as to be outwardly expanded by the peripheral face of the electricity storage device 100. As a result, a force that pushes the peripheral face of the electricity storage device 100 against the inner face 211 of the accommodation part 210 is generated. Thus, the double-sided adhesive tape 800 can be well attached to the peripheral face of the electricity storage device 100 and the inner face 211 of the accommodation part 210. Accordingly, adhesion (joining force) can be enhanced. In addition, due to the adhesion of the double-sided adhesive tape 800 and the friction force that acts between the projections 215a of the pair of claw parts 215 and the peripheral face of the electricity storage device 100, a creep phenomenon in which the electricity storage device 100 slips along the inner face 211 of the accommodation part 210 due to the weight of the electricity storage device 100 can be made less likely to occur.

<Modification 2>

Figure 16A:
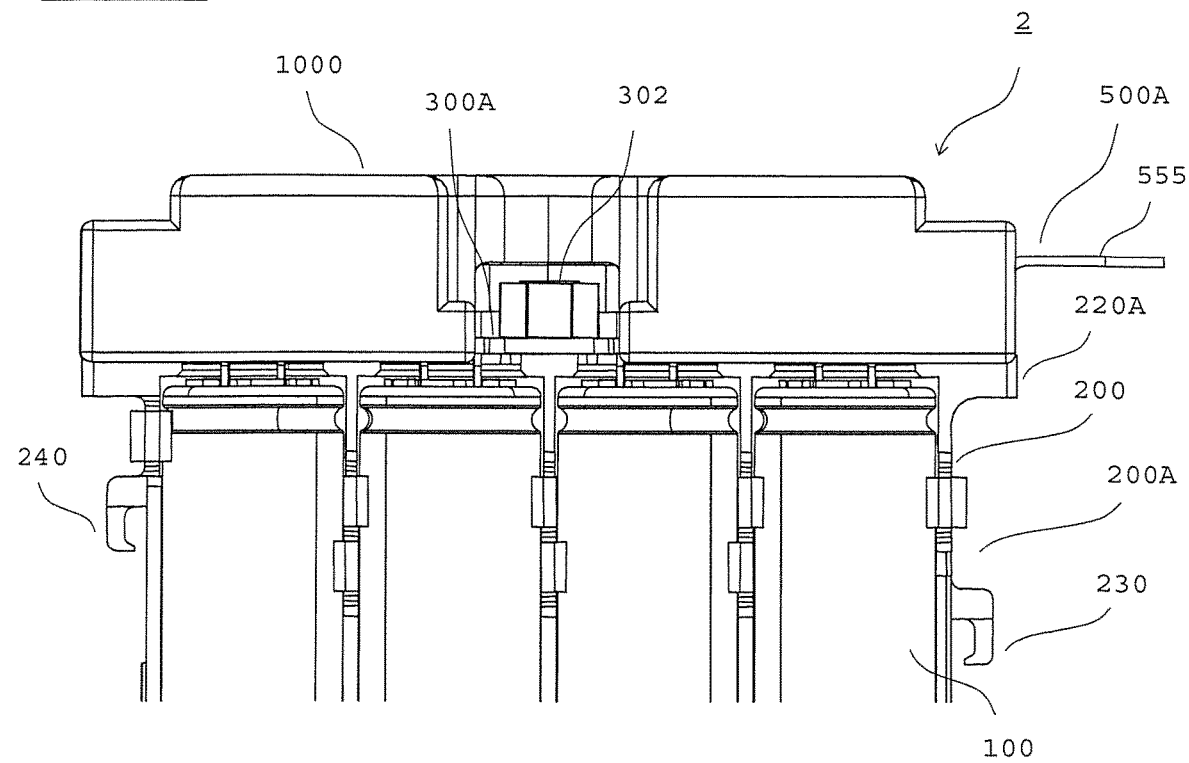
FIG. 16A is a front view of an upper portion of an electricity storage module according to Modification 2.
Figure 16B:
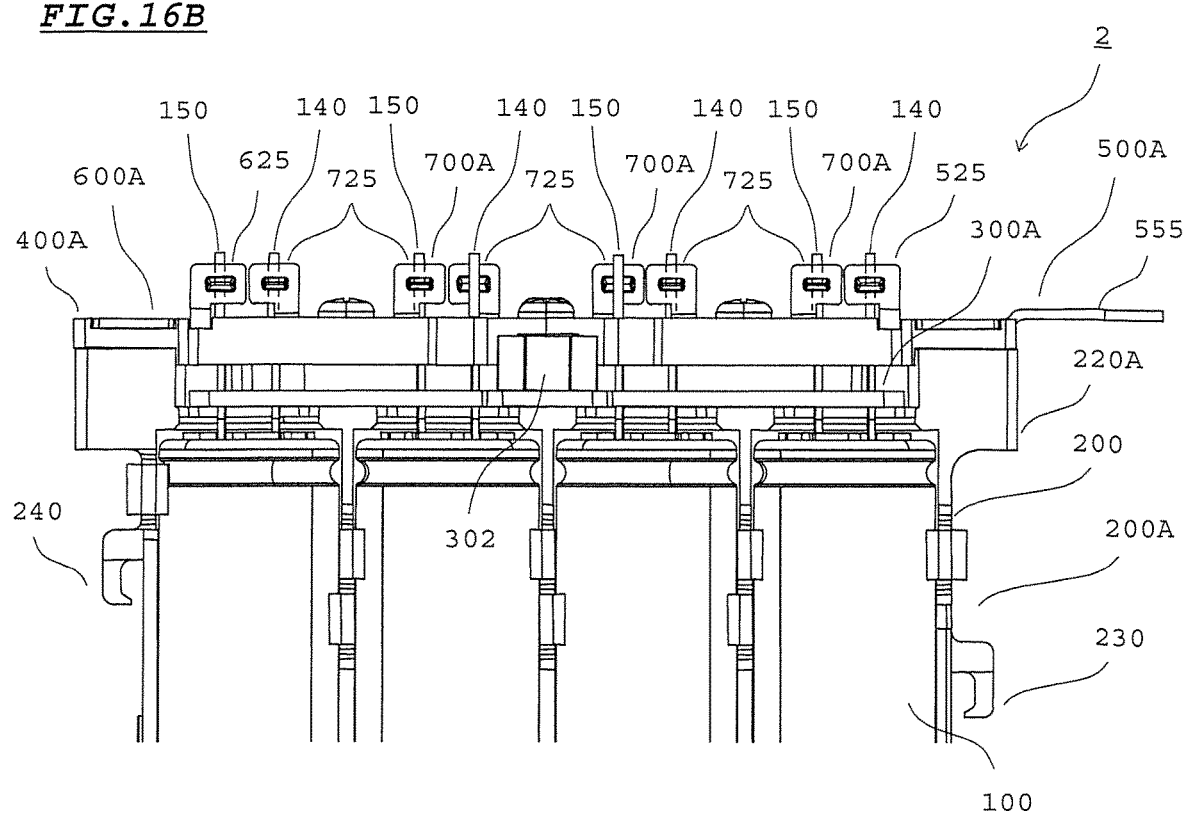
FIG. 16B is a front view of an upper portion of the electricity storage module according to Modification 2.
Figure 18:
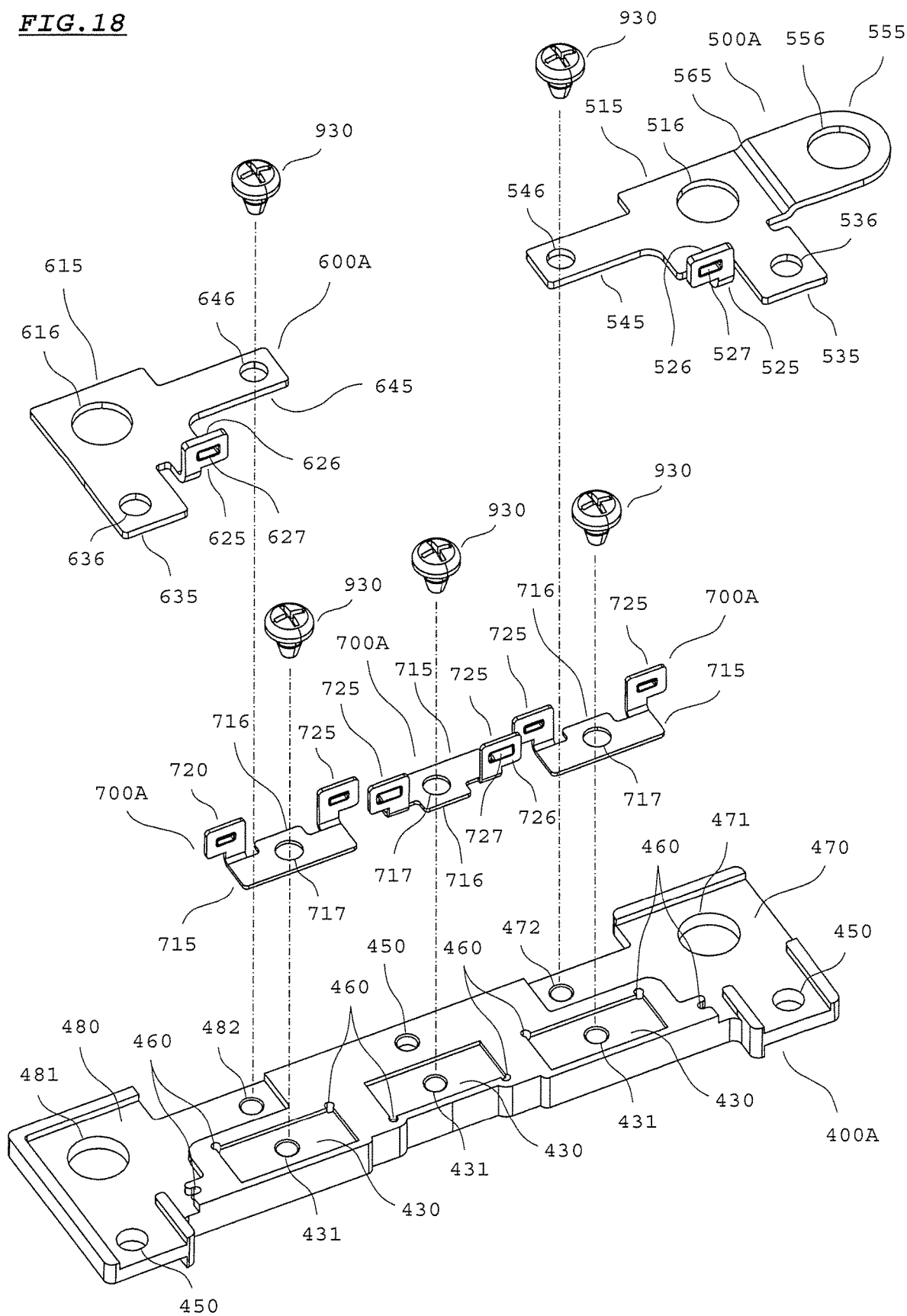
FIG. 18 is an exploded perspective view of a terminal holder, a first external output terminal, a second external output terminal, and relay connection terminals according to Modification 2.
Figure 19A:
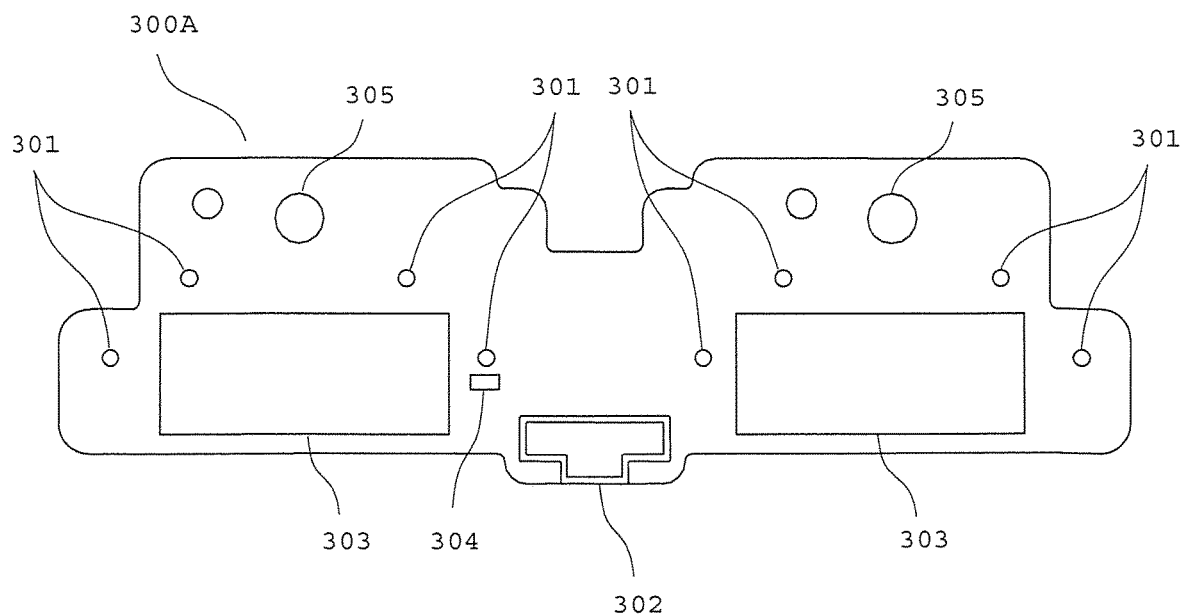
FIG. 19A is a plan view of a circuit board according to Modification 2.
Figure 19B:
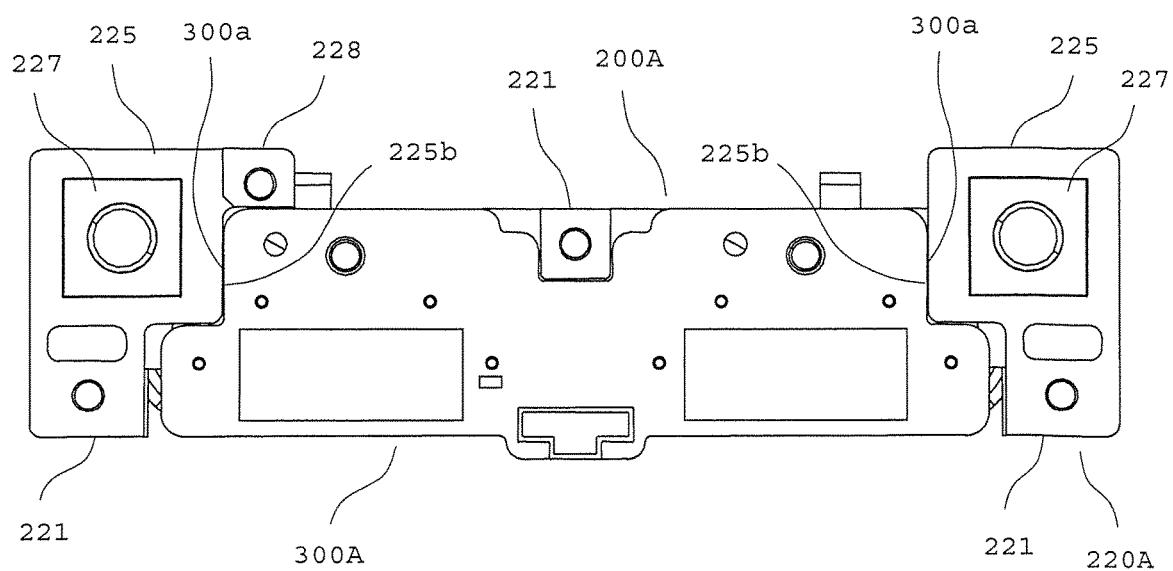
FIG. 19B is a plan view of a device holder having the circuit board attached thereto, according to Modification 2.

FIG. 16A is a front view of an upper portion of an electricity storage module 2 according to Modification 2. FIG. 16B is a front view of an upper portion of the electricity storage module 2 according to Modification 2. FIG. 17 is an exploded perspective view of an upper portion of the electricity storage module 2 according to Modification 2. FIG. 18 is an exploded perspective view of a terminal holder 400A, a first external output terminal 500A, a second external output terminal 600A, and relay connection terminals 700A according to Modification 2. FIG. 19A is a plan view of a circuit board 300A according to Modification 2, and FIG. 19B is a plan view of a device holder 200A having the circuit board 300A attached thereto, according to Modification 2. In these drawings, the same components as those in the above embodiment are denoted by the same reference characters.

The electricity storage module 2 of the present modification includes: four electricity storage devices 100; the device holder 200A, the circuit board 300A, the terminal holder 400A, the first external output terminal 500A, the second external output terminal 600A, and the relay connection terminals 700A, which are respectively partially different from the device holder 200, the circuit board 300, the terminal holder 400, the first external output terminal 500, the second external output terminal 600, and the relay connection terminals 700 in the above embodiment; and a terminal cover 1000.

As for the device holder 200A, the configuration of a mounting plate 220A provided above the four accommodation parts 210 is different from the configuration of the mounting plate 220 of the device holder 200 in the above embodiment. In the mounting plate 220A, similarly to the mounting plate 220, mounting bosses 221 each having a mounting hole 221a are provided in a corner portion on the left front side, a corner portion on the right front side, and a rear portion at the center. Mounting holes 223 are formed at the left and the right to the mounting boss 221 in the rear portion at the center. In the mounting plate 220A, opening portions 224 are formed at positions above the accommodation parts 210, respectively. Each opening portion 224 does not have the shape of the opening portion 222 of the above embodiment, but has a shape of which a rear portion is in an arc shape. Further, in the mounting plate 220A, nut mounting parts 225 each having a quadrangular prism shape and greater than the mounting boss 221 are formed at the rear of the mounting bosses 221 in the left and right corner portions. Each nut mounting part 225 and a corresponding mounting boss 221 are coupled by two coupling ribs 226. A part of the right nut mounting part 225 slightly protrudes into the rightmost opening portion 224, and a part of the left nut mounting part 225 slightly protrudes into the leftmost opening portion 224. A quadrangular recessed part 225a is formed in each nut mounting part 225, and a quadrangular nut 227 made from metal is embedded in the recessed part 225a. Further, a mounting boss 228 for mounting the terminal cover 1000 is formed at the right of the left nut mounting part 225. The mounting boss 228 is formed in a quadrangular prism shape and has a mounting hole 228a.

The circuit board 300A is only different from the circuit board 300 of the above embodiment in that the outer shape is slightly different, and includes four pairs of through-holes 301 and two insertion holes 305, similar to the circuit board 300 of the above embodiment. Further, the connector 302 and the electronic circuit part 303 are disposed on the circuit board 300A.

Different form the circuit board 300 of the above embodiment, on the circuit board 300A of the present modification, the temperature sensor 304 is disposed only in the vicinity of one through-hole 301 of the second pair of through-holes 301 from the left. In this manner, in the present modification, whether or not there is an overheat state of the electricity storage device 100 at the center portion where heat tends to accumulate is monitored by the temperature sensor 304, whereby whether or not there are any overheat states of the four electricity storage devices 100 is monitored. Accordingly, the number of temperature sensors 304 can be reduced. The temperature sensor 304 may be disposed at the back surface (lower face) of the circuit board 300A, not at the front surface (upper face) thereof. Alternatively, a configuration may be employed in which the temperature sensor 304 is disposed so as to correspond to each or any one of the electricity storage devices 100, or a configuration may be employed in which the temperature sensors 304 are disposed so as to correspond to any two or three of the electricity storage devices 100.

As shown in FIG. 19B, in a state where the circuit board 300A is attached to the mounting plate 220A of the device holder 200A, the circuit board 300A is in a state where rear portions of both of left and right end portions 300a are substantially in contact with side faces 225b on the inner side of the left and right nut mounting parts 225. Accordingly, the circuit board 300A is in a state where both the left and right sides thereof are sufficiently guarded. Thus, when the circuit board 300A is fastened and fixed to the mounting plate 220A by the board fixing screws 910, the circuit board 300A is less likely to be rotated and displaced on the mounting plate 220A due to the fastening torque.

Similar to the terminal holder 400 of the above embodiment, the terminal holder 400A includes: three third terminal mounting parts 430 having third mounting holes 431; three insertion holes 450; and four pairs of terminal insertion holes 460. In addition, the terminal holder 400A includes a first terminal mounting part 470 and a second terminal mounting part 480 which respectively have different configurations from those of the first terminal mounting part 410 and the second terminal mounting part 420 of the terminal holder 400 of the above embodiment. In the first terminal mounting part 470, a first mounting hole 472 similar to the first mounting hole 412 of the first terminal mounting part 410 of the above embodiment is formed, without the recessed part 411 being formed, and a first insertion hole 471 through which a fixing bolt 940 is passed is formed instead of the recessed part 411. In the second terminal mounting part 480, a second mounting hole 482 similar to the second mounting hole 422 of the second terminal mounting part 420 of the above embodiment is formed, without the recessed part 421 being formed, and a second insertion hole 481 through which a fixing bolt 940 is passed is formed instead of the recessed part 421. Further, the depths of the first terminal mounting part 470 and the second terminal mounting part 480 are greater than the depth of each third terminal mounting part 430, and can be about two times the depth of the third terminal mounting part 430, for example.

The first external output terminal 500A includes an external connection terminal part 515, a lead terminal connection part 525, a first fixation part 535, a second fixation part 545, and a step part 565 which respectively have substantially the same configurations as those of the external connection terminal part 510, the lead terminal connection part 520, the first fixation part 530, the second fixation part 540, and the step part 560 of the first external output terminal 500 of the above embodiment. The first external output terminal 500A includes a coupling terminal part 555 which has a different shape from that of the coupling terminal part 550 of the first external output terminal 500 of the above embodiment and of which an end portion is formed in an arc shape. An insertion hole 516 is formed in the external connection terminal part 515. An insertion hole 536 is formed in the first fixation part 535. An insertion hole 546 is formed in the second fixation part 545. An insertion hole 556 is formed in the coupling terminal part 555. A projection 527 is formed on a connection face 526 of the lead terminal connection part 525.

The second external output terminal 600A includes an external connection terminal part 615, a lead terminal connection part 625, a first fixation part 635, and a second fixation part 645 which respectively have substantially the same configurations as those of the external connection terminal part 610, the lead terminal connection part 620, the first fixation part 630, and the second fixation part 640 of the second external output terminal 600 of the above embodiment. An insertion hole 616 is formed in the external connection terminal part 615. An insertion hole 636 is formed in the first fixation part 635. An insertion hole 646 is formed in the second fixation part 645. A projection 627 is formed on a connection face 626 of the lead terminal connection part 625.

Each relay connection terminal 700A includes a terminal body part 715 and two lead terminal connection parts 725. Similar to the terminal body part 710 of the relay connection terminal 700 of the above embodiment, the terminal body part 715 includes a fixation part 716 having an insertion hole 717, but the width in the front-rear direction of portions at the right and left sides of the fixation part 716 is greater than the width in the front-rear direction of portions at the right and left sides of the fixation part 711 in the terminal body part 710. The configuration of each lead terminal connection part 725 is substantially the same as that of each lead terminal connection part 720 of each relay connection terminal 700 of the above embodiment. A projection 727 is formed on a connection face 726 of the lead terminal connection part 725.

In the terminal holder 400A, the first external output terminal 500A, the second external output terminal 600A, and the three relay connection terminals 700A are respectively fixed to the first terminal mounting part 470, the second terminal mounting part 480, and the three third terminal mounting parts 430 by the terminal fixing screws 930. The insertion hole 516 of the external connection terminal part 515 of the first external output terminal 500A is aligned with the first insertion hole 471 of the first terminal mounting part 470. The insertion hole 616 of the external connection terminal part 615 of the second external output terminal 600A is aligned with the second insertion hole 481 of the second terminal mounting part 480. The coupling terminal part 555 of the first external output terminal 500A is in a state of protruding to the outer side of the terminal holder 400A, in the direction (left-right direction) in which the first external output terminal 500A and the second external output terminal 600A are arranged. The first external output terminal 500A, the second external output terminal 600A, and the relay connection terminals 700A respectively fitted in the first terminal mounting part 470, the second terminal mounting part 480, and the third terminal mounting parts 430 have movements into the front-rear and left-right directions restricted, and thus are less likely to move in the front-rear and left-right directions when the terminal fixing screws 930 are to be fastened or when the terminal fixing screws 930 have been loosened.

Here, the thicknesses of the first external output terminal 500A and the second external output terminal 600A are greater than, e.g., about two times, the thicknesses of the first external output terminal 500 and the second external output terminal 600 of the above embodiment. The thickness of each relay connection terminal 700A is the same as that of each relay connection terminal 700 of the above embodiment. Thus, the thickness of each of the first external output terminal 500A and the second external output terminal 600A is greater than the thickness of the relay connection terminal 700A. Accordingly, the strength of the first external output terminal 500A and the second external output terminal 600A is increased. Therefore, when the first external output terminal 500A and the second external output terminal 600A have respectively corresponding external terminals fastened and fixed thereto with use of the fixing bolts 940, damages and the like are less likely to be caused in the first external output terminal 500A and the second external output terminal 600A.

The terminal cover 1000 includes: a cover body 1100 which covers the terminal holder 400A and the circuit board 300A from above; and a front face plate 1200 which extends downward from the front edge of the cover body 1100 and which covers the terminal holder 400A and the circuit board 300A from front. The cover body 1100 is configured such that: a rear portion in a right end portion is recessed inwardly so as not to cover the external connection terminal part 515 of the first external output terminal 500A; a rear portion in a left end portion is recessed inwardly so as not to cover the external connection terminal part 615 of the second external output terminal 600A; and a center portion in a front end portion is recessed inwardly so as not to cover the connector 302 of the circuit board 300A. The front face plate 1200 is not formed in the portion corresponding to the connector 302.

As for the cover body 1100, first mounting tabs 1110 each having an insertion hole 1111 are provided in front portions in both of left and right end portions of the cover body 1100, and a second mounting tab 1120 having an insertion hole 1121 is provided at the left end in a rear end portion of the cover body 1100. On the upper face of the cover body 1100, a plus sign 1131 representing the polarity of the first external output terminal 500A is provided at the right end position, and a minus sign 1132 representing the polarity of the second external output terminal 600A is provided at the left end position.

When the electricity storage module 2 is to be assembled, four electricity storage devices 100 are attached to the device holder 200A, first. The angle in the circumferential direction of each electricity storage device 100 is the same as in the above embodiment. The peripheral face of each electricity storage device 100 and the inner face of a corresponding accommodation part 210 are joined by the double-sided adhesive tape 800.

Next, the circuit board 300A is fixed to the mounting plate 220A of the device holder 200A by the board fixing screws 910. At this time, the positive electrode lead terminal 140 and the negative electrode lead terminal 150 of each electricity storage device 100 are passed through a corresponding pair of through-holes 301, and are electrically connected to the pair of through-holes 301 by soldering.

Next, the terminal holder 400A to which the first external output terminal 500A, the second external output terminal 600A, and the three relay connection terminals 700A are attached is fixed to the mounting plate 220A of the device holder 200A by the holder fixing screws 920. At this time, a holder fixing screw 920 is fastened only to the mounting boss 221 in the center rear portion of the mounting plate 220A, and holder fixing screws 920 are not yet fastened to the mounting bosses 221 at the right end and the left end.

When the terminal holder 400A is fixed on the mounting plate 220A, the recessed parts 225a of both the left and right nut mounting parts 225 accommodating the nuts 227 are closed by the terminal holder 400A. The first insertion hole 471 of the terminal holder 400A is aligned with a bolt hole 227a of the right nut 227, and the second insertion hole 481 of the terminal holder 400A is aligned with a bolt hole 227a of the left nut 227.

The positive electrode lead terminal 140 and the negative electrode lead terminal 150 of each electricity storage device 100 are passed through a corresponding pair of terminal insertion holes 460, and the leading end portions thereof extend upward from the surface (upper face) of the terminal holder 400A. The connection faces 526, 626, 726 of the lead terminal connection parts 525, 625, 725 in the first external output terminal 500A, the second external output terminal 600A, and the relay connection terminals 700A extend along the extending direction of the leading end portions of corresponding positive electrode lead terminals 140 and negative electrode lead terminals 150. Therefore, a state is established in which the projections 527, 627, 727 of the connection faces 526, 626, 726 are close to the leading end portions of the corresponding positive electrode lead terminals 140 and negative electrode lead terminals 150. Also in the present modification, when viewed in the extending direction of the positive electrode lead terminals 140 and the negative electrode lead terminals 150, the projections 527, 627, 727 do not overlap corresponding terminal insertion holes 460. Thus, when the leading end portions of the positive electrode lead terminals 140 and the negative electrode lead terminals 150 are caused to protrude above relative to the projections 527, 627, 727, movements of the positive electrode lead terminals 140 and the negative electrode lead terminals 150 are less likely to be hindered by the projections 527, 627, 727.

In this manner, as shown in FIG. 16B, the electricity storage module 2 is assembled to be in a state before the terminal holder 400A and the circuit board 300A are covered by the terminal cover 1000. Then, similar to the above embodiment, by projection welding, the positive electrode lead terminals 140 and the negative electrode lead terminals 150 are connected and fixed to the corresponding lead terminal connection parts 525, 625, 725.

Finally, the terminal holder 400A and the circuit board 300A are covered by the terminal cover 1000. A holder fixing screw 920 is passed through the insertion hole 1111 of the right first mounting tab 1110 of the terminal cover 1000, the insertion hole 536 of the first fixation part 535 of the first external output terminal 500A, and the right insertion hole 450 of the terminal holder 400A, and then, the holder fixing screw 920 is fasten to the mounting boss 221 at the right end of the mounting plate 220A. Similarly, a holder fixing screw 920 is passed through the insertion hole 1111 of the left first mounting tab 1110 of the terminal cover 1000, the insertion hole 636 of the first fixation part 635 of the second external output terminal 600A, and the left insertion hole 450 of the terminal holder 400A, and then, the holder fixing screw 920 is fastened to the mounting boss 221 at the left end of the mounting plate 220A. Accordingly, both the left and right end portions of the terminal holder 400A are fixed to the mounting plate 220A. In addition, the terminal cover 1000 is fixed to the terminal holder 400. Further, the first external output terminal 500A and the second external output terminal 600 A are fixed to the terminal holder 400A also by the holder fixing screws 920. It should be noted that the terminal cover 1000 is fixed also to the mounting plate 220A by a cover fixing screw 950 being passed through the insertion hole 1121 of the second mounting tab 1120 and fastened to the mounting boss 228.

In this manner, the electricity storage module 2 is completed as shown in FIG. 16A. The external connection terminal part 515 of the first external output terminal 500A, the external connection terminal part 615 of the second external output terminal 600A, and the connector 302 of the circuit board 300A are not covered by the terminal cover 1000, and are exposed to the outside. An external terminal on the positive electrode side from an external apparatus is connected to the external connection terminal part 515 by a fixing bolt 940, and an external terminal on the negative electrode side from the external apparatus is connected to the external connection terminal part 615 by a fixing bolt 940. At this time, the fixing bolt 940 on the first external output terminal 500A side is passed through the first insertion hole 471 of the terminal holder 400A and fastened to the right nut 227 of the mounting plate 220A. The fixing bolt 940 on the second external output terminal 600A side is passed through the second insertion hole 481 of the terminal holder 400A and fastened to the left nut 227 of the mounting plate 220A.

In the above embodiment, the nuts 440 are attached in the recessed parts 411, 421 provided in the terminal holder 400, and the first external output terminal 500 and the second external output terminal 600 are directly mounted on the recessed parts 411, 421 which are in an open state. In contrast, in the present modification, the nuts 227 are attached in the recessed parts 225a provided in the nut mounting parts 225 of the device holder 200A (the mounting plate 220A), and the first external output terminal 500A and the second external output terminal 600A are disposed above the recessed parts 225a via the terminal holder 400A, such that the recessed parts 225a are closed by the terminal holder 400A. Accordingly, the nuts 227 attached in the recessed parts 225a are pressed, at the upper faces thereof, by the terminal holder 400A, and are rigidly held by the nut mounting parts 225 and the terminal holder 400A. Thus, the fastening strength between the fixing bolts 940 and the nuts 227 is increased. Therefore, the first external output terminal 500A, the second external output terminal 600A, and the external terminals can be rigidly fastened to one another.

Also in the present modification, similar to the above embodiment, an electricity storage unit can be formed by combining a plurality of the electricity storage modules 2. In this case, the coupling terminal part 555 of the first external output terminal 500A of one electricity storage module 2 is overlaid from above on the external connection terminal part 615 of the second external output terminal 600A of the other electricity storage module 2, and fixed by a fixing bolt 940. In addition, the first coupling part 230 of the one electricity storage module 2 and the second coupling part 240 of the other electricity storage module 2 are coupled to each other by the coupling member 20.

Also in the electricity storage module 2 of the present modification and the electricity storage unit formed by a plurality of the electricity storage modules 2, effects similar to those by the electricity storage module 1 and the electricity storage unit 10 of the above embodiment can be exhibited.

<Modification 3>

Figure 20A:
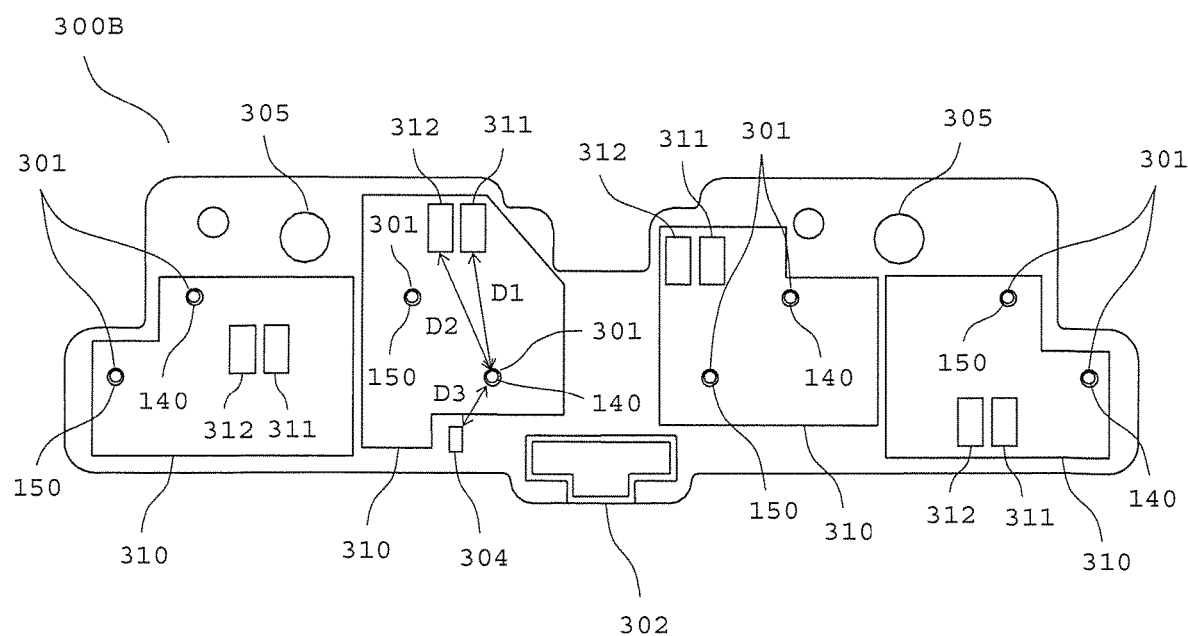
FIG. 20A is a plan view of a circuit board in a state of having the positive electrode lead terminals and the negative electrode lead terminals passed therethrough, according to Modification 3.

FIG. 20A is a plan view of a circuit board 300B in a state of having the positive electrode lead terminals 140 and the negative electrode lead terminals 150 passed therethrough, according to Modification 3.

The circuit board 300B of the present modification can be used in place of the circuit board 300 of the above embodiment or the circuit board 300A of Modification 2 above. In FIG. 20A, in the circuit board 300B of the present modification, the same components as those in the circuit board 300 and the circuit board 300A are denoted by the same reference characters.

In the present modification, balancing resistors 311, 312 correspond to "heat generation element" described in claims. The positive electrode lead terminal 140 corresponds to "one lead terminal" described in claims, and the negative electrode lead terminal 150 corresponds to "another lead terminal" described in claims.

In the circuit board 300B, a voltage detection-balance adjustment circuit 310 (hereinafter, simply referred to as "balance adjustment circuit 310"), which is an electronic circuit part, is provided around each pair of through-holes 301, so as to correspond to each electricity storage device 100. Each balance adjustment circuit 310 includes two balancing resistors 311, 312 connected in parallel. When the voltage of the electricity storage device 100 corresponding to the balance adjustment circuit 310 is high, the balance adjustment circuit 310 causes current to flow in the two balancing resistors 311, 312, to decrease the voltage of electricity storage device 100. The voltage of each electricity storage device 100 is adjusted by the corresponding balance adjustment circuit 310 in this manner, whereby voltage balance among the electricity storage devices 100 is maintained.

On the circuit board 300B, similar to the circuit board 300A of Modification 2 above, the temperature sensor 304 is disposed only in the vicinity of one through-hole 301 of the second pair of through-holes 301 from the left. The temperature sensor 304 detects the temperature of the positive electrode lead terminal 140 passed through the one through-hole 301. Accordingly, an overheat state of the second electricity storage device 100 from the left is monitored, whereby overheat states of the four electricity storage devices 100 are monitored.

Here, when current flows in the balancing resistors 311, 312, the balancing resistors 311, 312 generate heat. In the present modification, in the second balance adjustment circuit 310 from the left, distances D1, D2 between the positive electrode lead terminal 140 of which the temperature is detected by the temperature sensor 304 and the balancing resistors 311, 312 are set to be greater than a distance D3 between the positive electrode lead terminal 140 and the temperature sensor 304. Thus, heat generated by the balancing resistors 311, 312 are less likely to reach the positive electrode lead terminal 140 and the temperature sensor 304. Therefore, the temperature of the positive electrode lead terminal 140, i.e., the electricity storage device 100, can be accurately measured by the temperature sensor 304.

In the present modification, due to the relationship of the withstand power of each balancing resistor 311, 312, two balancing resistors 311, 312 are provided to one balancing circuit 310. However, one balancing resistor having a large withstand power may be provided to one balancing circuit 310.

Figure 20B:
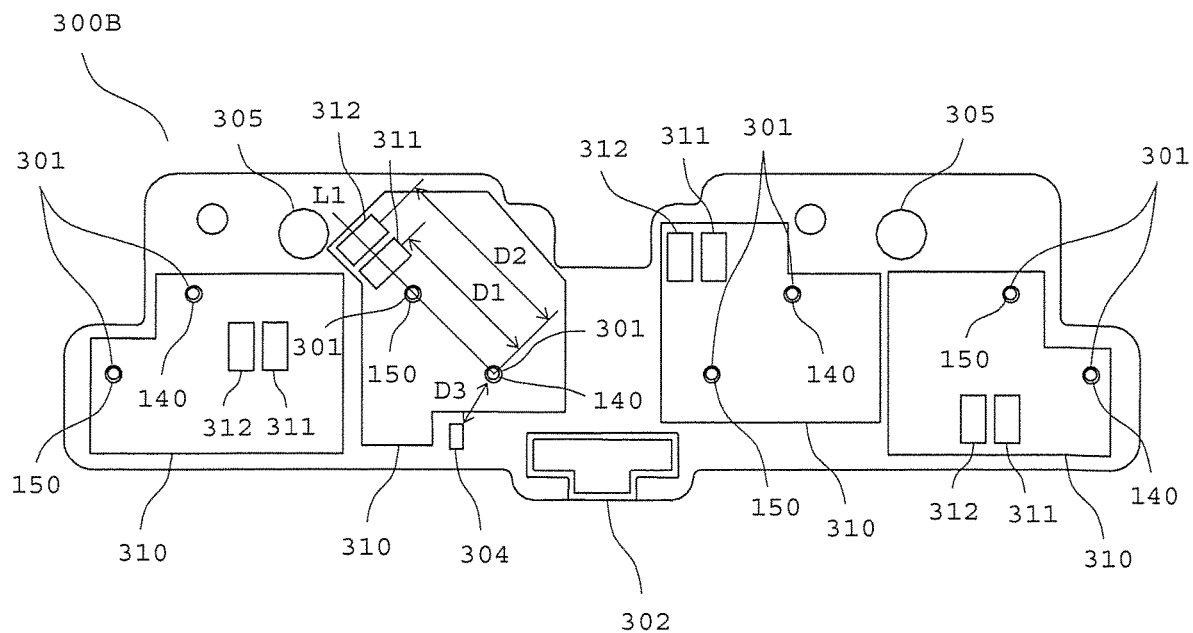
FIG. 20B shows another configuration example of the circuit board, according to Modification 3.

FIG. 20B shows another configuration example of the circuit board 300B, according to Modification 3.

In the second balancing circuit 310 from the left that corresponds to the electricity storage device 100 of which the temperature is monitored by the temperature sensor 304, the arrangement of the balancing resistors 311, 312 can be changed as in the configuration example shown in FIG. 20B. That is, in this configuration example, in the circuit board 300B, the two balancing resistors 311, 312 are disposed on a line L1 that passes the positive electrode lead terminal 140 and the negative electrode lead terminal 150, and on the side opposite to the positive electrode lead terminal 140 with respect to the negative electrode lead terminal 150.

When such a configuration is employed, heat from the balancing resistors 311, 312 toward the positive electrode lead terminal 140 is obstructed by the negative electrode lead terminal 150. Thus, heat generated by the balancing resistors 311, 312 is further less likely to reach the positive electrode lead terminal 140.

In the present configuration example, only either one of the two balancing resistors 311, 312 may be disposed on the line L1 that passes the positive electrode lead terminal 140 and the negative electrode lead terminal 150, and on the side opposite to the positive electrode lead terminal 140 with respect to the negative electrode lead terminal 150.

In the present modification, the temperature of the positive electrode lead terminal 140 is detected by the temperature sensor 304, but instead, the temperature of the negative electrode lead terminal 150 may be detected. In this case, the distances between the negative electrode lead terminal 150 and the balancing resistors 311, 312 are set to be greater than the distance between the negative electrode lead terminal 150 and the temperature sensor 304. Further, in the present modification, when a heat generation element other than the balancing resistors 311, 312 is included in the balancing circuit 310, a configuration may be employed in which the distance between the heat generation element and the lead terminal 140, 150 of which the temperature is to be detected is set to be greater than the distance between the temperature sensor 304 and the lead terminal 140, 150 of which the temperature is to be detected.

In the present modification, on the circuit board 300B, the temperature sensor 304 is disposed so as to be close to the positive electrode lead terminal 140. However, the temperature sensor 304 may be disposed at an equal distance from each of the positive electrode lead terminal 140 and the negative electrode lead terminal 150. In this case, the temperatures of the positive electrode lead terminal 140 and the negative electrode lead terminal 150 are detected by the temperature sensor 304. In addition, all the distances from the balancing resistors 311, 312 to the positive electrode lead terminal 140 and the negative electrode lead terminal 150 are set to be greater than all the distances between the temperature sensor 304, the positive electrode lead terminal 140, and the negative electrode lead terminal 150.

<Modification 4>

Figure 21A:
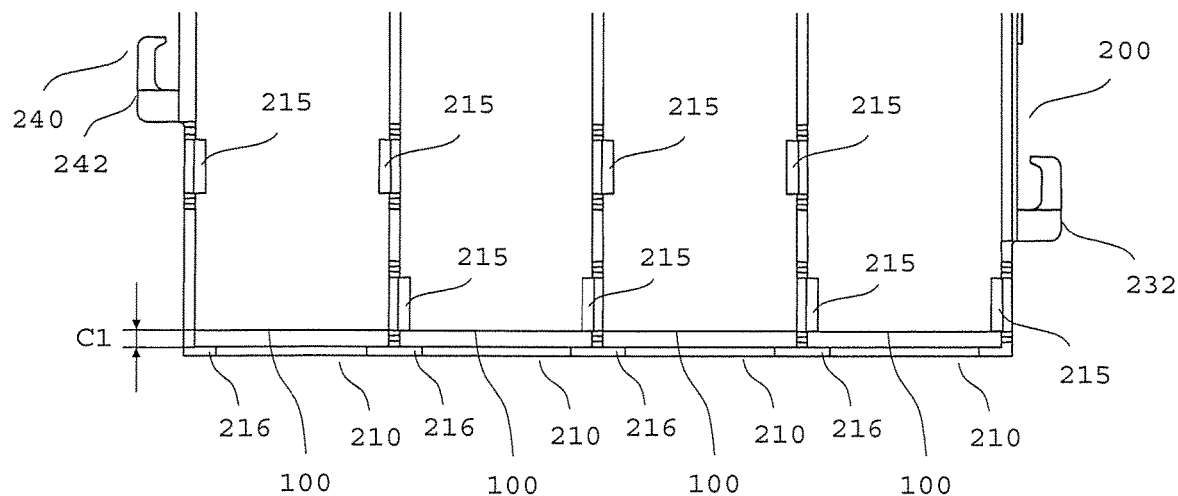
FIG. 21A is a front view of a lower portion of a device holder having the electricity storage devices attached thereto, according to Modification 4.
Figure 21B:
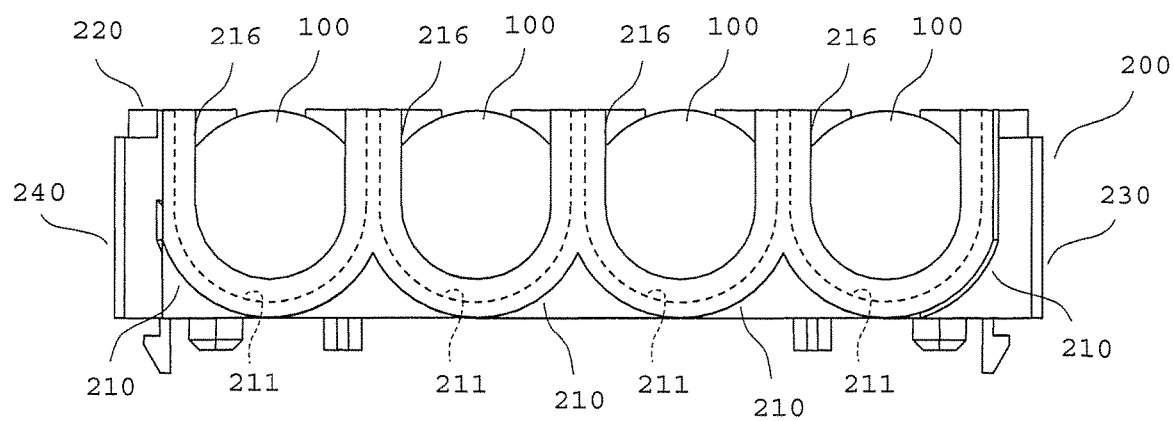
FIG. 21B is a bottom view of the device holder having the electricity storage devices attached thereto, according to Modification 4.

FIG. 21A is a front view of a lower portion of the device holder 200 having the electricity storage devices 100 attached thereto, according to Modification 4. FIG. 21B is a bottom view of the device holder 200 having the electricity storage devices 100 attached thereto, according to Modification 4.

As shown in FIGS. 21A and 21B, in the device holder 200 of the present modification, a rib 216 in a U-shape is formed at the bottom face of each accommodation part 210 in order to reinforce the accommodation part 210. A clearance C1 is provided between the rib and the bottom face of the electricity storage device 100 accommodated in the accommodation part 210. Accordingly, even when gas is generated in the electricity storage device 100 due to aged deterioration, the internal pressure is increased, and the bottom face of the electricity storage device 100 bulges downwardly, the bulge can be absorbed by the clearance C. Thus, the rib 216 is less likely to be pushed by the bulged bottom face of the electricity storage device 100, and damages and the like are less likely to be caused in the rib 216.

<Other Modifications>

In the above embodiment, the step part 560 is provided between the external connection terminal part 510 and the coupling terminal part 550 of the first external output terminal 500. However, the step part 560 may be eliminated by making the heights on the terminal holder 400 of the external connection terminal part 510 and the coupling terminal part 550 equal. In this case, the height on the terminal holder 400 of the external connection terminal part 610 of the second external output terminal 600 is set to be less than the height of the external connection terminal part 510 by the thickness of the coupling terminal part 550. Accordingly, the lower face of the coupling terminal part 550 and the upper face of the external connection terminal part 610 are at the same height position in the up-down direction.

In a case where the electricity storage module 1 is used in an environment in which rigid connection between the electricity storage module 1 and an external terminal is not required, a configuration may be employed in which the external connection terminal part 510 is not provided in the first external output terminal 500 and the external terminal is connected to the coupling terminal part 550.

In the present embodiment described above, the coupling terminal part 550 of the first external output terminal 500 is in a state of protruding to the outer side of the terminal holder 400 in the direction in which the first external output terminal 500 and the second external output terminal 600 are arranged. However, the coupling terminal part 550 may protrude in a direction (front-rear direction) perpendicular to the direction in which the first external output terminal 500 and the second external output terminal 600 are arranged. In this case, if the electricity storage unit 10 is formed by the first electricity storage module 1A and the second electricity storage module 1B, the first electricity storage module 1A and the second electricity storage module 1B are arranged in the front-rear direction such that the first external output terminal 500 of the first electricity storage module 1A and the second external output terminal 600 of the second electricity storage module 1B are adjacent to each other, for example.

Further, in the above embodiment, the container 110 of the electricity storage device 100 has a cylindrical shape, but the container 110 may have another shape such as a quadrangular tubular shape.

Further, in the above embodiment, four electricity storage devices 100 are used in the electricity storage module 1, but the present invention is not limited thereto. Any other number, including one, of electricity storage devices 100 may be used in the electricity storage module 1. Further, the electricity storage module 1 may be configured such that the plurality of electricity storage devices 100 are not connected in series but are connected in parallel.

Further, in the above embodiment, the first external output terminal 500 serves as the output terminal on the positive electrode side, and the second external output terminal 600 serves as the output terminal on the negative electrode side. However, in the reverse of this, the first external output terminal 500 may serve as the output terminal on the negative electrode side, and the second external output terminal 600 may serve as the output terminal on the positive electrode side. In this case, each electricity storage device 100 is held in the device holder 200 such that the positive electrode lead terminal 140 and the negative electrode lead terminal 150 are set in a direction reverse to that in the above embodiment.

Further, in the above embodiment, the terminal holder 400 is provided as a separate body from the device holder 200, and is fixed to the device holder 200 by the holder fixing screws 920 to be integrated with the device holder 200. However, the device holder 200 and the terminal holder 400 may be integrally formed with each other.

Further, in the above embodiment, the second external output terminal 600 is provided completely on the inner side of the terminal holder 400. However, a portion of the second external output terminal 600 that would not cause any obstruction for connection may protrude from the terminal holder 400.

Further, in the above embodiment, in the first region 211a of the inner face 211 of each accommodation part 210 of the device holder 200, the narrowed part 111 is formed on the peripheral face of the electricity storage device 100 opposed thereto, and the peripheral portions 112 are bulged. Therefore, since sufficient adhesion of the double-sided adhesive tape 800 is less likely to be exerted, the inner face 211 (the semicircular arc face 212) of the accommodation part 210 and the peripheral face of the electricity storage device 100 are not joined by the double-sided adhesive tape 800. However, if it is necessary to more rigidly fix the electricity storage device 100 to the accommodation part 210, joining by the double-sided adhesive tape 800 may be provided also in the first region 211a.

In the above embodiment, the double-sided adhesive tape 800 is configured as an acrylic adhesive formed in a sheet shape and does not include any base material. However, although the double-sided adhesive tape 800 having such a configuration is preferably used, if a sufficient joining force can be obtained between the electricity storage device 100 and the accommodation part 210 of the device holder 200, an adhesive other than acrylic adhesive such as a silicone-based or a rubber-based adhesive may be used as the double-sided adhesive tape 800, and a base material may be included.

Further, in the above embodiment, the electricity storage device 100 is structured such that electric power is drawn through the positive electrode lead terminal 140 and the negative electrode lead terminal 150. However, the electricity storage device 100 may be structured such that electric power is drawn through a positive electrode terminal and a negative electrode terminal that are in a plate-shape.

Further, in the embodiment described above, each accommodation part 210 of the device holder 200 is configured to accommodate substantially the entirety of the electricity storage device 100. However, the accommodation part 210 may accommodate at least a part of the electricity storage device 100.

In the above embodiment, the positive electrode lead terminals 140 and the negative electrode lead terminals 150 are joined to the corresponding lead terminal connection parts 520, 620, 720 by projection welding. However, the positive electrode lead terminals 140 and the negative electrode lead terminals 150 may be fixed and connected to the corresponding lead terminal connection parts 520, 620, 720 by welding other than projection welding, or by a joining method other than welding. Similarly, in the configuration of Modification 2 described above, the positive electrode lead terminals 140 and the negative electrode lead terminals 150 may be fixed and connected to the lead terminal connection parts 525, 625, 725 by welding other than projection welding, or by a joining method other than welding.

Further, in the above embodiment, the through-holes 301 of which the insides are metal-plated are formed in the circuit board 300. However, a configuration may be employed in which through-holes of which the insides are not metal-plated are formed in the circuit board 300, and lands for soldering are formed around the through-holes in the surface of the circuit board 300.

Further, in Modification 1 described above, the projections 215a are provided to each pair of claw parts 215. However, the present invention is not limited thereto. Each pair of claw parts 215 may be curved at a curvature smaller than the curvature of the peripheral face of the electricity storage device 100, such that the pair of claw parts 215 are elastically deformed so as to be expanded outwardly by the peripheral face of the electricity storage device 100 accommodated in the accommodation part 210, thereby generating a force that pushes the peripheral face of the electricity storage device 100 against the inner face 211 of the accommodation part 210.

Other than this, various changes can be made as appropriate to the embodiments of the present invention within the scope of the technical idea described in claims.

It should be noted that, in the description of the above embodiment, the terms that indicate directions such as "up" and "down" are relative directions that depend only on the positional relationship between component members, and do not indicate absolute directions such as the vertical direction and the horizontal direction.

INDUSTRIAL APPLICABILITY

The present invention is useful for electricity storage modules and electricity storage units that are used in various types of electronic apparatuses, electric apparatuses, industrial apparatuses, electrical equipment of vehicles, and the like.

DESCRIPTION OF THE REFERENCE CHARACTERS 1 electricity storage module
1A first electricity storage module (first electricity storage module)
1B second electricity storage module (second electricity storage module)
10 electricity storage unit
20 coupling member
100 electricity storage device
110 container
111 narrowed part
120 device element
130 sealing body
140 positive electrode lead terminal (lead terminal)
150 negative electrode lead terminal (lead terminal)
200 device holder (device holding part)
210 accommodation part
211 inner face
211a first region
211b second region
214 step
215 pair of claw parts (support part)
230 first coupling part (first coupling part)
240 second coupling part (second coupling part)
300 circuit board
301 through-hole (through-hole)
303 electronic circuit part
304 temperature sensor
400 terminal holder (terminal attachment part)
410 first terminal mounting part (first receiving part)
420 second terminal mounting part (second receiving part)
440 nut
460 terminal insertion hole (insertion part)
500 first external output terminal (first output terminal, connection terminal)
510 external connection terminal part (third terminal part)
511 insertion hole
520 lead terminal connection part (terminal connection part)
522 projection
550 coupling terminal part (first terminal part)
560 step part
600 second external output terminal (second output terminal, connection terminal)
610 external connection terminal part (second terminal part)
611 insertion hole
620 lead terminal connection part (terminal connection part)
622 projection
700 relay connection terminal (connection terminal)
720 lead terminal connection part (terminal connection part)
800 double-sided adhesive tape (joining member)
S1 accommodation space
S2 accommodation space
930 terminal fixing screw (first fixation tool, second fixation tool)
940 fixing bolt
C clearance L connection line
D array direction

The invention claimed is:

1. An electricity storage module comprising:
a plurality of electricity storage devices capable of discharging stored electric power;
a device holding part in which the plurality of electricity storage devices are held;
a first output terminal and a second output terminal which have polarities different from each other and which are configured to be electrically connected to the plurality of electricity storage devices; and
a terminal attachment part having one end portion and another end portion, the one end portion being configured to have the first output terminal attached thereto, the other end portion being configured to have the second output terminal attached thereto, wherein:
the first output terminal is formed of a conductive metal plate and includes a first terminal part protruding to an outer side of the terminal attachment part,
the second output terminal is formed of a conductive metal plate and includes a second terminal part in a plate-shape attached to a surface of the terminal attachment part and capable of being connected to an external terminal or the first terminal part on an inner side of the terminal attachment part,
the first output terminal further includes a third terminal part in a plate-shape attached to the surface of the terminal attachment part,
the first terminal part is in a plate-shape and is formed as a same part as the third terminal part,
each of the plurality of electricity storage devices includes a pair of lead terminals that extends to an outside through the terminal attachment part along a straight line and does not bend at intermediate portions thereof,
the terminal attachment part is disposed in an extending direction of each pair of lead terminals from the plurality of electricity storage devices held in the device holding part,
each of the lead terminals of the pair of lead terminals is electrically connected to a connection terminal that includes the first output terminal and the second output terminal and that is attached to the terminal attachment part, and
in the extending direction, a circuit board is disposed so as to be sandwiched between the device holding part and the terminal attachment part, the circuit board having an electronic circuit part to which the pair of lead terminals is electrically connected.

2. The electricity storage module according to claim 1, wherein
the circuit board includes a through-hole that is provided for each lead terminal and through which the lead terminal directed toward the terminal attachment part is passed, and
the lead terminal is electrically connected, in a portion of the through-hole, to the electronic circuit part.

3. The electricity storage module according to claim 2, wherein
the plurality of electricity storage devices are held in the device holding part in a state where the plurality of electricity storage devices are arrayed in one direction, and
when the arrayed plurality of electricity storage devices are viewed in the extending direction,
a virtual line that connects one lead terminal and the outer lead terminal of the pair of lead terminals of each of the electricity storage devices is inclined with respect to an array direction of the plurality of electricity storage devices, and
between the electricity storage devices that are adjacent to each other, the virtual lines are respectively inclined to opposite sides with respect to the array direction.

4. The electricity storage module according to claim 2, wherein
on the circuit board, a temperature sensor is disposed at a distance from one, of the through-holes, through which one of the lead terminals of at least one of the electricity storage devices is passed, the distance being shorter than a distance between the one of the through-holes and another, of the through-holes, through which another of the lead terminals of the at least one of the electricity storage devices is passed.

5. The electricity storage module according to claim 2, wherein
a temperature sensor is disposed on the circuit board, the temperature sensor being configured to detect a temperature of the lead terminal passed though the through-hole,
the electronic circuit part includes a heat generation element, and
a distance between the heat generation element and the lead terminal is longer than a distance between the temperature sensor and the lead terminal.

6. The electricity storage module according to claim 5, wherein
the temperature sensor detects a temperature of one lead terminal, of the pair of lead terminals, that is closer to the temperature sensor, and
a distance between the heat generation element and the one lead terminal is longer than a distance between the temperature sensor and the one lead terminal.

7. The electricity storage module according to claim 6, wherein
on the circuit board, the heat generation element is disposed on a line that passes the one lead terminal and another lead terminal that is far from the temperature sensor, and on a side opposite to the one lead terminal with respect to the other lead terminal.

8. The electricity storage module according to claim 5, wherein
the heat generation element is a balancing resistor configured to adjust voltage balance among the plurality of electricity storage devices.

9. The electricity storage module according to claim 1, wherein
the terminal attachment part is fixed to the device holding part.

10. An electricity storage module comprising:
a plurality of electricity storage devices capable of discharging stored electric power;
a device holding part in which the plurality of electricity storage devices are held;
a first output terminal and a second output terminal which have polarities different from each other and which are configured to be electrically connected to the plurality of electricity storage devices; and
a terminal attachment part having one end portion and another end portion, the one end portion being configured to have the first output terminal attached thereto, the other end portion being configured to have the second output terminal attached thereto, wherein:

the first output terminal is formed of a conductive metal plate and includes a first terminal part protruding to an outer side of the terminal attachment part, the second output terminal is formed of a conductive metal plate and includes a second terminal part in a plate-shape attached to a surface of the terminal attachment part and capable of being connected to an external terminal or the first terminal part on an inner side of the terminal attachment part, the first output terminal further includes a third terminal part in a plate-shape attached to the surface of the terminal attachment part, the first terminal part is in a plate-shape and is formed as a same part as the third terminal part, each of the plurality of electricity storage devices includes a pair of lead terminals that extends to an outside through the terminal attachment part extend to outside along a straight line and does not bend at intermediate portions thereof, the terminal attachment part is disposed in an extending direction of each pair of lead terminals from the plurality of electricity storage devices held in the device holding part, each of the lead terminals of the pair of lead terminals is electrically connected to a connection terminal that includes the first output terminal and the second output terminal and that is attached to the terminal attachment part, and the connection terminal is formed of a conductive metal plate and includes a body part in a plate-shape arranged on the surface of the terminal attachment part and a terminal connection part in a plate-shape standing substantially perpendicular with respect to the body part and extending along the extending direction, and a peripheral face of each of the lead terminals of the pair of lead terminals is connected to the terminal connection part.

11. The electricity storage module according to claim 10, wherein the terminal attachment part includes an insertion part through which the lead terminal is passed, and the connection terminal is attached to a face, of the terminal attachment part, from which the lead terminal passed through the insertion part protrudes.

12. The electricity storage module according to claim 11, wherein the terminal connection part is provided with a projection, and the peripheral face of the lead terminal is joined to the projection.

13. The electricity storage module according to claim 12, wherein the insertion part includes a terminal insertion hole provided for each of the lead terminals, and when the terminal attachment part is viewed in the extending direction, the terminal insertion hole does not overlap the projection.

* * * * *